(12) United States Patent
Li et al.

(10) Patent No.: US 10,546,066 B2
(45) Date of Patent: Jan. 28, 2020

(54) END-TO-END LEARNING OF DIALOGUE AGENTS FOR INFORMATION ACCESS

(71) Applicant: Microsoft Technology Licensing, LLC, Redmond, WA (US)

(72) Inventors: Lihong Li, Redmond, WA (US); Bhuwan Dhingra, New Delhi (IN); Jianfeng Gao, Woodinville, WA (US); Xiujun Li, Tainjin (CN); Yun-Nung Chen, Taipei (TW); Li Deng, Redmond, WA (US); Faisal Ahmed, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 37 days.

(21) Appl. No.: 15/406,425

(22) Filed: Jan. 13, 2017

(65) Prior Publication Data
US 2018/0060301 A1   Mar. 1, 2018

Related U.S. Application Data

(60) Provisional application No. 62/382,194, filed on Aug. 31, 2016.

(51) Int. Cl.
*G06F 17/27*   (2006.01)
*G06N 3/08*   (2006.01)
(Continued)

(52) U.S. Cl.
CPC ........ *G06F 17/279* (2013.01); *G06F 17/2775* (2013.01); *G06N 3/08* (2013.01); *G06N 5/022* (2013.01); *G06N 7/005* (2013.01)

(58) Field of Classification Search
None
See application file for complete search history.

(56) References Cited

U.S. PATENT DOCUMENTS 8,725,666 B2 * 5/2014 Lemmond ........... G06F 16/3344
706/13
8,977,537 B2 * 3/2015 Burges ................ G06F 17/2818
704/9
(Continued)

FOREIGN PATENT DOCUMENTS

WO   WO2016039751   7/2016

OTHER PUBLICATIONS

Trischler (Trischler, Adam, et al. "Natural Language Comprehension with the EpiReader." arXiv preprint arXiv:1606.02270 (2016); published on Jun. 10, 2016).*
(Continued)

*Primary Examiner* — Pierre Louis Desir
*Assistant Examiner* — Jonathan C Kim
(74) *Attorney, Agent, or Firm* — Schwegman Lundberg & Woessner, P.A.

(57) ABSTRACT

Described herein are systems, methods, and techniques by which a processing unit can build an end-to-end dialogue agent model for end-to-end learning of dialogue agents for information access and apply the end-to-end dialogue agent model with soft attention over knowledge base entries to make the dialogue system differentiable. In various examples the processing unit can apply the end-to-end dialogue agent model to a source of input, fill slots for output from the knowledge base entries, induce a posterior distribution over the entities in a knowledge base or induce a posterior distribution of a target of the requesting user over entities from a knowledge base, develop an end-to-end differentiable model of a dialogue agent, use supervised and/or imitation learning to initialize network parameters, calculate a modified version of an episodic algorithm. e.g., the REINFORCE algorithm, for training an end-to-end differentiable model based on user feedback.

20 Claims, 10 Drawing Sheets

(51) Int. Cl.
 G06N 5/02 (2006.01)
 G06N 7/00 (2006.01)

(56) References Cited

U.S. PATENT DOCUMENTS

| | | | |
|---|---|---|---|
| 2004/0002931 A1 | 1/2004 | Platt et al. | |
| 2007/0005539 A1* | 1/2007 | Bergman | G06N 20/00 706/21 |
| 2014/0278424 A1* | 9/2014 | Deng | G10L 15/063 704/257 |
| 2015/0066496 A1* | 3/2015 | Deoras | G10L 15/16 704/232 |
| 2015/0095033 A1 | 4/2015 | Boles et al. | |
| 2015/0269934 A1* | 9/2015 | Biadsy | G10L 15/197 704/235 |
| 2016/0063992 A1 | 3/2016 | Selfridge | |
| 2016/0092766 A1* | 3/2016 | Sainath | G10L 25/30 706/20 |
| 2016/0093294 A1* | 3/2016 | Kapralova | G10L 15/063 704/232 |
| 2016/0099010 A1* | 4/2016 | Sainath | G10L 25/30 704/232 |
| 2016/0232440 A1 | 8/2016 | Gregor et al. | |
| 2017/0200077 A1* | 7/2017 | Weston | G06N 3/084 |
| 2017/0323203 A1* | 11/2017 | Matusov | G06F 17/289 |
| 2018/0032864 A1* | 2/2018 | Graepel | G06N 3/0427 |

OTHER PUBLICATIONS

Jungmann (Jungmann, Alexander, et al. "Incorporating reputation information into decision-making processes in markets of composed services." International Journal on Advances in Intelligent Systems 7.4 (2014).).*

Wen TH, Vandyke D, Mrksic N, Gasic M, Rojas-Barahona LM, Su PH, Ultes S, Young S. A network-based end-to-end trainable task-oriented dialogue system. arXiv preprint arXiv:1604.04562. Apr. 15, 2016. (Year: 2016).*

Mesnil G, Dauphin Y, Yao K, Bengio Y, Deng L, Hakkani-Tur D, He X, Heck L, Tur G, Yu D, Zweig G. Using recurrent neural networks for slot filling in spoken language understanding. IEEE/ACM Transactions on Audio, Speech, and Language Processing. Mar. 2015;23(3):530-9. (Year: 2015).*

Yin P, Lu Z, Li H, Kao B. Neural enquirer: Learning to query tables with natural language. arXiv preprint arXiv:1512.00965v2. Jan. 21, 2016 (Year: 2016).*

Dhingra, et al., "Towards End-to-End Reinforcement Learning of Dialogue Agents for Information Access", Retrieved from <<https://arxiv.org/pdf/1609.00777.pdf>> Apr. 20, 2017, 12 Pages.

Mrksic, et al., "Neural Belief Tracker: Data-Driven Dialogue State Tracking", Retrieved from <<https://arxiv.org/pdf/1606.03777v1.pdf>> Jun. 12, 2016, 11 Pages.

"International Search Report and Written Opinion Issued in PCT Application No. PCT/US2017/048098", dated Nov. 8, 2017, 14 Pages.

Su, et al., "Continuously Learning Neural Dialogue Management", Retrieved from <<https://arxiv.org/pdf/1606.02689.pdf>> Jun. 8, 2016, 6 Pages.

Chan, et al., "Deep Recurrent Neural Networks for Acoustic Modelling", In Journal of Computing Research Repository, Apr. 2015, 5 pages.

Henderson, et al., "Deep Neural Network Approach for the Dialog State Tracking Challenge", In Proceedings of the SIGDIAL Conference, Aug. 22, 2013, pp. 467-471.

Hinton, et al., "Deep Neural Networks for Acoustic Modeling in Speech Recognition", In Journal of Signal Processing Magazine, vol. 29, Issue 6, Nov. 2012, pp. 1-27.

Lipton, et al., "Efficient Exploration for Dialog Policy Learning with Deep BBQ Networks & Replay Buffer Spiking", In Publication of arXiv preprint arXiv:1608.05081, Aug. 17, 2016, pp. 1-16.

Mesnil, et al., "Using Recurrent Neural Networks for Slot Filling in Spoken Language Understanding", In Journal of IEEE/ACM Transactions on Audio, Speech, and Language Processing, vol. 23, No. 3, Mar. 2015, pp. 530-539.

"Microsoft Bot Builder Overview", Retrieved on: Aug. 30, 2016 Available at: https://github.com/Microsoft/BotBuilder/tree/master/CSharp/Samples/.

Peters, et al., "Policy gradient methods", In Journal of Encyclopedia of Machine Learning, Retrieved on: Aug. 30, 2016, pp. 1-4.

Ravuri, et al., "A comparative study of recurrent neural network models for lexical Domain classification", In Proceedings of IEEE International Conference on Acoustics, Speech and Signal Processing, Mar. 2016, 5 pages.

Serban, et al., "Building End-to-End Dialogue Systems Using Generative Hierarchical Neural Network Models", In Proceedings of the Thirtieth AAAI Conference on Artificial Intelligence, Feb. 12, 2016, pp. 3776-3783.

Wen, et al., "A Network-based End-to-End Trainable Task-oriented Dialogue System", In Journal of the Computing Research Repository, Apr. 2016, pp. 1-11.

* cited by examiner

400

KNOWLEDGE BASE (HEAD, RELATION, TAIL)
(GROUNDHOG DAY, ACTOR, BILL MURRAY)
(GROUNDHOG DAY, RELEASE YEAR, 1993)
(AUSTRALIA, ACTOR, NICOLE KIDMAN)
(MAD MAX: FURY ROAD, RELEASE YEAR, 2015)

FIG. 4A

| Movie | Actor | Release Year |
|---|---|---|
| Groundhog Day | Bill Murray | 1993 |
| Australia | Nicole Kidman | X |
| Mad Max: Fury Road | X | 2015 |

FIG. 4B

END-TO-END LEARNING OF DIALOGUE AGENTS FOR INFORMATION ACCESS

BACKGROUND

Traditional goal-oriented dialogue systems are intended to help users complete specific tasks, such as booking a flight or searching a database. Such conventional systems approach such tasks by interacting with users via natural language. Traditional goal-oriented dialogue systems also typically need to interact with an external database to access real-world knowledge. Previous goal-oriented dialogue systems interacted with the external database by issuing a symbolic query to the database and adding retrieved results to the dialogue state. Previous end-to-end systems constructed a symbolic query from the current belief states of the agent and retrieved results from the database that matched the query. However, such symbolic operations typically break the differentiability of the models used by traditional goal-oriented dialogue systems and prevent end-to-end gradient-based training of neural dialogue agents. Thus, existing machine learning systems have, up to now, focused on piece-wise training of end-to-end system components.

Statistical goal-oriented dialogue systems have long been modeled as partially observable Markov decision processes (POMDPs), which are trained using reinforcement learning (RL) based on user feedback.

In the last decade, goal-oriented dialogue systems (DSs) have been incorporated in various devices, with the goal being to enable users to speak to systems in order to finish tasks more efficiently. A typical goal-oriented dialogue system consists of four basic components—a language understanding (LU) module for inferring user intents and extracting associated slots, a dialogue state tracker which tracks the user goal and dialogue history, a dialogue policy which selects the next system action based on the current dialogue state, and a natural language generator (NLG) for converting dialogue acts into natural language. For successful completion of user goals, it is also necessary to equip the dialogue policy with real-world knowledge from a database. A typical pipeline of tasks in language understanding (LU) is to parse user utterances into semantic frames to capture meaning. The first task is to decide the domain given the input utterance, and based on the domain, the second task is to predict the intent, and then the third task is to fill associated slots corresponding to a domain-specific semantic template.

Such traditional approaches have several disadvantages. First, errors from previous turns are propagated to subsequent turns. Thus, earlier errors degrade performance of the current and subsequent turns. Second, knowledge mentioned in the long history is often not carried into the current turn as only a few turns are aggregated.

Improvement in accuracy and processing speed for LU is important for conversation understanding systems like digital personal assistants.

SUMMARY

This disclosure describes systems, methods, and computer-executable instructions on computer-readable media for a new type of dialogue agent (e.g., KB-InfoBot) that provides users with an entity from a knowledge base (KB) by interactively asking for the entity's attributes and training components of the dialogue agent, e.g., KB-InfoBot in an end-to-end fashion using reinforcement and imitation learning. The architecture described herein can replace symbolic queries with an induced "soft" posterior distribution over a KB that indicates which entities the user is interested in. A modified version of the episodic REINFORCE algorithm, can allow the dialogue agent, e.g., KB-InfoBot to explore and learn both the policy for selecting dialogue acts and the posterior over the KB for retrieving the correct entities.

In various examples, the architecture described herein can operate as a goal-oriented dialogue system to help users complete specific tasks, such as booking a flight, searching a knowledge base (KB), etc., by interacting with the users via natural language. Introducing a new type of dialogue agent (e.g., KB-InfoBot) that provides users with entities from a KB, by interactively asking the user for additional attributes of that entity which can help constrain the search. Such an agent finds application in interactive search settings.

This Summary is provided to introduce a selection of concepts in a simplified form that are further described below in the Detailed Description. This Summary is not intended to identify key and/or essential features of the claimed subject matter, nor is it intended to be used as an aid in determining the scope of the claimed subject matter. The term "techniques," for instance, can refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar and/or identical items.

FIGS. 4A and 4B illustrate example formats of an entity-centric knowledge base the dialogue agent can access where head entities are the subject of a user's request, e.g., movies, and other entries include tail entity values and relations. e.g., release date and actor according to various illustrative examples described herein.

FIG. 4A depicts a few example knowledge base entries in head-relation-tail (hrt) format according to various examples described herein.

FIG. 4B depicts a few example knowledge base entries in table format according to various examples described herein.

DETAILED DESCRIPTION

Overview

Figure 1:
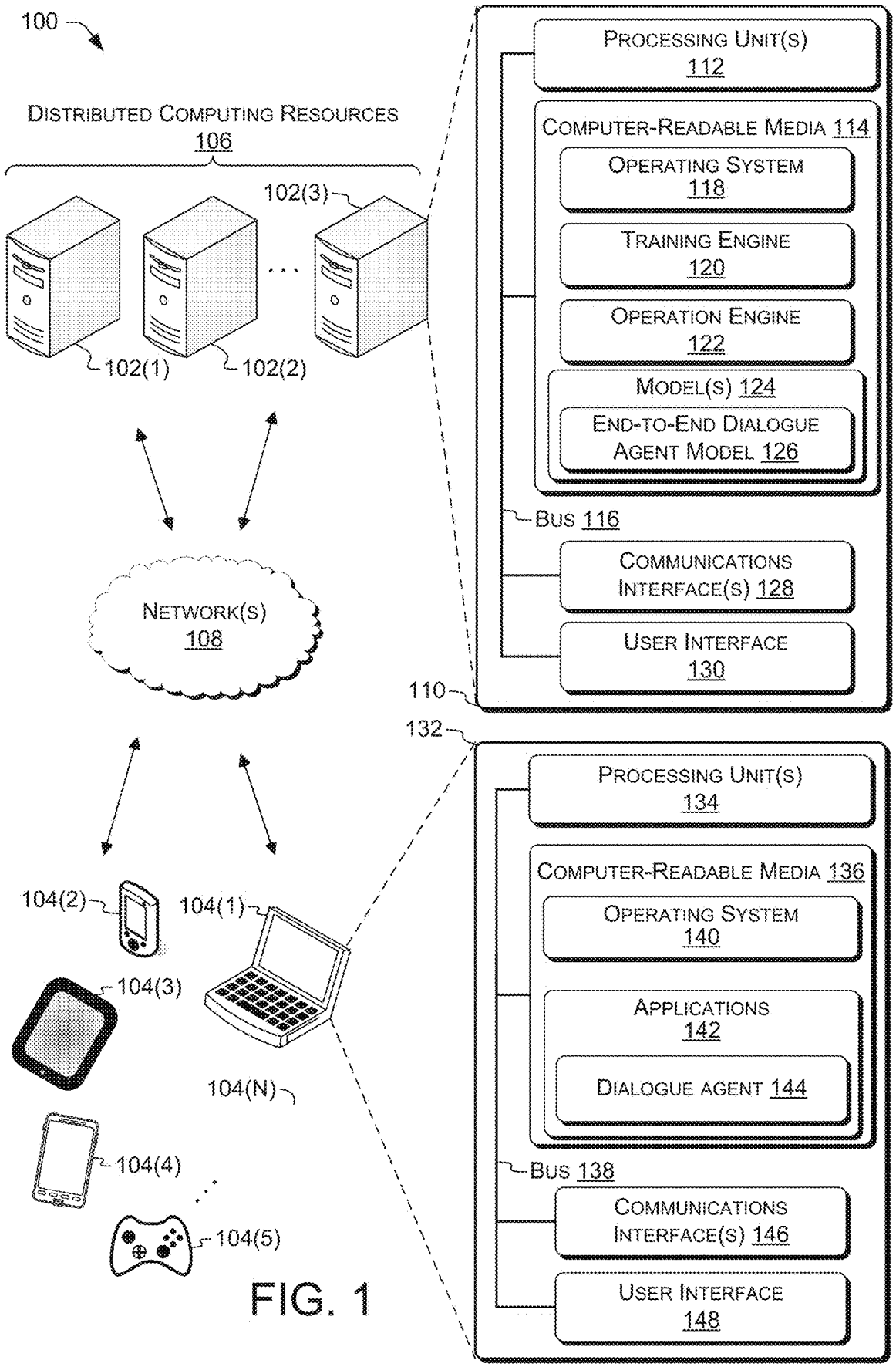
FIG. 1 is a block diagram depicting an example environment for implementing end-to-end learning of dialogue agents for information access as described herein.

Examples described herein provide techniques and constructs for an improved dialogue agent, e.g., KB-InfoBot, that provides users with an entity from a knowledge base (KB) by interactively asking the requesting user for attributes of the requested entity, where components of the dialogue agent, e.g., in some examples, all components of the dialogue agent, are trained in an end-to-end fashion using reinforcement learning. In contrast to typical goal-oriented dialogue systems, which access an external knowledge base (KB) to for real-world knowledge, e.g., movies playing in a city, flight availability, flight times, etc., by issuing a symbolic query to the KB and adding retrieved results to the dialogue state, examples of the improved dialogue agent described herein can replace symbolic queries with an induced "soft" posterior distribution over the KB for e.g., movies playing in a city, flight availability, flight times, etc., that indicates which entities the user is interested in. The improved dialogue agent described herein can employ a modified version of the episodic REINFORCE algorithm, which allows the dialogue agent, e.g., KB-InfoBot, to explore and learn both the policy for selecting dialogue acts and the posterior over the KB for retrieving the correct entities. Also, in contrast to conventional symbolic operations, which break differentiability of the system and prevent end-to-end training of neural dialogue agents, experimental results show that examples of an improved dialogue agent trained end-to-end, as described herein, can outperform competitive rule-based baselines, as well as agents which are not end-to-end trainable.

In various examples, techniques described herein can provide end-to-end learning of a dialogue system for information access by a gradient descent, e.g., stochastic gradient descent, mechanism. In some examples, techniques described herein include one or more of: extracting features, e.g., n-grams, from input, using a neural network, e.g., a recurrent neural network, a gated recurrent neural network, etc. layer, a fully connected layer, and/or soft-max non-linearity to model posterior probabilities, computing posterior distribution over database entries, e.g., slots, to make the KB differentiable, computing an entropy over a goal of an individual, in some instances, each, slot such that entropy computation is differentiable, and/or using the calculated entropies and posteriors to output probability of a next action.

Goal-oriented dialogue systems help requesting users complete specific tasks, such as booking a flight or searching a KB, by interacting with the requesting users via natural language. An improved dialogue agent, e.g., KB-InfoBot, as described herein can provide users with entities from a KB, by interactively asking for additional attributes of that entity which helps constrain the search. Such an agent finds application in interactive search settings.

A typical goal-oriented dialogue system consists of four basic components—a language understanding (LU) module for predicting user intents and extracting associated slots, a dialogue state tracker which keeps tracking the user goal and dialogue history, a dialogue policy which selects the next system action based on the current state, and a natural language generator (NLG) for converting dialogue acts into natural language. For successful completion of user goals, the dialogue policy can access real-world knowledge from a KB. Previous end-to-end systems achieved this by constructing a symbolic query from the current belief states of the agent and retrieving results from the KB which match the query. Unfortunately, such operations break the differentiability of the model, and hence machine learning systems focus on piece wise training of the above components separately.

An improved dialogue agent as described herein can replace the SQL-like query with a probabilistic framework for inducing a posterior distribution of the user target over KB entities. A dialogue system implementing an improved dialogue agent as described herein can build this distribution from the belief tracker multinomials over slot-values and binomial probabilities of the requesting user not knowing the value of a slot. The policy network can receive as input this full distribution to select its next action. In addition to making the model end-to-end trainable, this operation can also provide a principled framework to propagate the uncertainty inherent in language understanding to the policy network.

The entire model as described herein can be differentiable, which means that the described system can be trained completely end-to-end using a reinforcement signal from the requesting user—in some instances only a reinforcement signal from the requesting user. However, in some example experiments with random initialization, the improved dialogue agent did not demonstrate a reward for the random initialization when the KB was large enough, and even when the improved dialogue agent does demonstrate a reward for the random initialization credit assignment can be ambiguous. Hence, in some examples, at the beginning of training the described system can first have an imitation learning phase in which both the belief tracker and policy network are trained to mimic a rule-based agent. Then, on switching to reinforcement learning, the dialogue agent can improve further and increase average reward.

Examples as described herein can provide at least three improvements over existing systems. First, a probabilistic framework can induce a posterior distribution over the entities in a Knowledge Base. Second, the example probabilistic framework described herein can develop, a fully end-to-end differentiable model of a multi-turn information providing dialogue agent, e.g, KB-InfoBot, whose parameters can be tuned using standard gradient descent methods. Third, a modified version of the episodic REINFORCE algorithm can update rules for training a fully endto-end differentiable model based on user feedback, which can allow the agent to explore a set of possible dialogue acts at each turn and/or a set of possible entity results from the KB at the final turn.

Historically, statistical goal-oriented dialogue systems have been modeled as partially observable Markov decision processes (POMDPs), which are trained using reinforcement learning (RL) based on user feedback. Recently, there has been increased interest in designing "end-to-end" systems, which combine feature extraction and policy optimization using deep neural networks, with the aim of eliminating the need of hand-crafted representations. Discussion herein is intended to highlight such methods of interfacing with the external KB to contrast with the improved methods of examples of the improved dialogue agent described herein.

One previous proposal, termed SimpleDS, uses a multi-layer feed-forward network to directly map environment states to agent actions. In SimpleDS the network is trained using deep Q-learning and a simulated user: however it does not interact with a structured KB, leaving that task to a server, which experiments with examples of an improved dialogue agent as described herein have shown may be suboptimal.

Another previous proposal, introduced a modular dialogue agent, which consists of several neural network based components trained using supervised learning. One key component of the previous modular dialogue agent is the KB operator, which forms a query according to equation 1:

$$q_t = \bigcup_{s' \in S_1} \operatorname*{argmax}_{v} p_{s'}^t \qquad (1)$$

where $p_{s'}^t$, are distributions over the possible values of each slot and are output from the belief tracker. In the previous modular dialogue agent, the query is issued to the KB which returns a list of the matched entries. Herein this operation is referred to as a Hard-KB lookup. Hard-KB lookup breaks the differentiability of the whole system, and as a result training needs to be performed in two stages—the intent network and belief trackers are trained using supervised labels specifically collected for them; while the policy network and generation network are trained separately on the system utterances. In contrast, an example improved dialogue agent as described herein can retain modularity of the network by keeping the belief trackers separate. Examples of improved dialogue agents as described herein can replace the query with a differentiable lookup over the KB which computes a posterior distribution denoting the probability that the user is looking for a particular entry.

Historically, an alternative way for a dialogue agent to interface with the KB is by augmenting its action space with predefined API calls. Such historical API calls modify a query hypothesis maintained outside the end-to-end system which is used to retrieve results from this KB. Historically, these results are then appended to the next system input based on which the agent selects it next action. The resulting historical model is end-to-end differentiable, though the KB falls out of the historical model. Hence, this historical framework cannot deal with uncertainty in language understanding since the query hypothesis can only hold one slot-value at a time. Examples of an approach for an improved dialogue agent as described herein, on the other hand, can directly model the uncertainty to identify a posterior over the KB.

A recent entropy minimization dialogue management (EMDM) strategy for bots, always asks for the slot with maximum entropy over the remaining entries in the KB. The recent entropy minimization dialogue management (EMDM) strategy for bots approach can be optimal in the absence of LU errors, but the strategy suffers from error propagation issues. The rule-based policy can be treated as a baseline for comparison to examples of an improved dialogue agent as described herein.

Previously neural GenQA and neural enquirer models for querying KB and tables via natural language in a fully "nueralized" way handled single-turn dialogues and were trained using supervised learning. In contrast, examples of an improved dialogue agent model are designed for multi-turn dialogues and trained using reinforcement learning. Moreover, instead of defining an attention distribution directly over the KB entities, which may be very large, an improved dialogue agent model as described herein instead induce attention distribution from the smaller distributions over each relation (or slot in dialogue terminology) in the KB. A separate line of work-TensorLog-investigates reasoning over KB facts in a differentiable manner to derive new facts. Instead, an improved dialogue agent model as described herein can focus on retrieving facts from the KB.

Recently, reinforcement learning neural Turing machines (RL-NTM) that allow neural controllers to interact with discrete external interfaces were introduced. The particular form of interface considered for such reinforcement learning neural Turing machines (RL-NTM) is a one-dimensional memory tape along which a read head can move. Examples of improved dialogue agents as described herein can employ a different interface, an entity-centric KB. Examples of improved dialogue systems as described herein can exploit the structure of such KBs to provide differentiable access to improved dialogue agents as described herein for making decisions.

Experiments show that the proposed architecture can effectively perform in training and simulations and outperform the results using state-of-the-art base-line agents.

As used herein a bot represents an autonomous program on a network, generally the Internet, that can interact with computer systems or users.

As used herein a dialogue agent represents a computer-based entity that operates from a computer-implemented dialogue system to converse with a human user, with a human-like interaction structure. A dialogue agent can employ language, spoken language, text, graphics, haptics, gestures, and/or other modes to communicate via input to the computer-implemented dialogue system and/or output from the computer-implemented dialogue system.

Some examples use distributed computing resources and/or processing units provisioned as part of a cluster computing system ("computing cluster" or "cluster") having several discrete computing nodes that work together to accomplish a computing task assigned to the cluster as a whole. Some such systems can have all or a portion of the cluster deployed in a distributed manner, aka in the cloud. Distributed or cloud computing allows for computing resources to be provided as services rather than a deliverable product. For example, in a cloud-computing environment, resources such as computing power, software, information, and/or network connectivity are provided (for example, through a rental agreement) over a network, such as the Internet. As used herein, the term "computing" used with reference to computing clusters, nodes, and jobs refers generally to computation, data manipulation, and/or other programmatically-controlled operations. The term "resource" used with reference to clusters, nodes, and jobs refers generally to any commodity and/or service provided by the cluster for use by jobs. Resources can include processor cycles, disk space, random-access memory (RAM) space, network bandwidth (uplink, downlink, or both), prioritized network channels such as those used for communications with quality-of-service (QoS) guarantees, backup tape space and/or mounting/unmounting services, electrical power, etc.

In various examples, e.g., of computational models trained for end-to-end learning of dialogue agents for information access and/or other use cases noted herein, the computational models may include artificial neurons, e.g., as found in multilayer perceptrons and/or other neural networks. A neural network can have none, one or more, or at least two hidden layers. The techniques described herein may include the use of an algorithm to parallelize the training of RNNs across multiple processing units, e.g., cores of a multi-core processor and/or multiple general-purpose graphics processing units (GPGPUs). Accordingly, multiple layers of RNNs may be processed in parallel on the multiple processing units. Neural networks such as RNNs can be trained with minibatch-based stochastic gradient descent (SGD). Other frameworks besides SGD can be used, e.g., minibatch non-stochastic gradient descent and/or other mathematical-optimization techniques.

In some examples, an RNN can include artificial neurons interconnected so that the output of a first unit can serve as a later input to the first unit and/or to another unit not in the layer immediately following the layer containing the first unit. Examples include Elman networks in which the outputs of hidden-layer artificial neurons are fed back to those neurons via memory cells, and Jordan networks, in which the outputs of output-layer artificial neurons are fed back via the memory cells.

In some examples, algorithms for computational-model training as described herein can be performed on a computing device, such as a smart phone, a tablet, a desktop computer, a server, a server blade, a supercomputer, etc. The resulting models can be used on such computing devices and/or on computing devices having one or more input devices, such as a physical keyboard, a soft keyboard, a touch screen, a touch pad, microphone(s), and/or camera(s).

Experiments have demonstrated that the end-to-end learning of dialogue agents for information access described herein outperform the results using state-of-the-art base-line agents.

Various environments, configurations of electronic devices, and methods for training and using computational models, e.g., for control applications, are described further with reference to FIGS. 1-8. While many examples described herein relate to servers and other non-consumer electronic devices, other types of electronic devices can be used, e.g., as discussed with reference to FIG. 1.

Illustrative Environment

FIG. 1 shows an example environment 100 in which examples of an improved dialogue agent as described herein, can operate and/or in which computational-model training for end-to-end neural networks for multi-turn language understanding and/or use methods for end-to-end neural networks for contextual, e.g., multi-turn, language understanding by improved dialogue agents such as those described herein can be performed. In the illustrated example, the various devices and/or components illustrated in scenario 100 include computing device(s) 102(1)-102(N) (individually and/or collectively referred to herein with reference 102), where N is any integer greater than and/or equal to 1, e.g., distributed computing resource(s), and computing devices 104(1)-104(K) (individually and/or collectively referred to herein with reference 104), where K is any integer greater than and/or equal to 1. In some examples, N=K; in other examples, N>K or N<K. Although illustrated as, e.g., desktop computers, laptop computers, tablet computers, and/or cellular phones, computing device(s) 102 and/or 104 can include a diverse variety of device categories, classes, and/or types and are not limited to a particular type of device.

In the illustrated example, computing device(s) 102(1)-102(N) can be computing nodes of distributed computing resources 106, e.g., in a computing cluster, such as a cloud service such as MICROSOFT AZURE, VMware vCloud, Rackspace, Inc.'s OpenStack, Amazon Web Services AWS, IBM SmartCloud, Oracle Cloud, etc. In the illustrated example, computing device(s) 104 can be clients of distributed computing resources 106 and can submit jobs to distributed computing resources 106 and/or receive job results from distributed computing resources 106. Computing devices 102(1)-102(N) in distributed computing resources 106 can, e.g., share resources, balance load, increase performance, and/or provide fail-over support and/or redundancy. Computing devices 104 can additionally or alternatively operate in a cluster and/or grouped configuration.

By way of example and not limitation, computing device(s) 102 and/or 104 can include, but are not limited to, server computers and/or blade servers such as Web servers, map/reduce servers and/or other computation engines, and/or network-attached-storage units (e.g., 102(1)), laptop computers, thin clients, terminals, and/or other mobile computers (e.g., 104(1)), wearable computers such as smart watches and/or biometric and/or medical sensors, implanted computing devices such as biometric and/or medical sensors, computer navigation client computing devices, satellite-based navigation system devices including global positioning system (GPS) devices and/or other satellite-based navigation system devices, personal data assistants (PDAs), and/or other specialized portable electronic devices (e.g., 104(2)), tablet computers (e.g., 104(3)), tablet hybrid computers, smartphones, mobile phones, mobile phone-tablet hybrid devices, and/or other telecommunication devices (e.g., 104(4)), sensors and/or other devices or systems for detecting characteristics of an environment, such as thermal, optical, vibratory, pressure, weather, and/or other sensors, portable and/or console-based gaming devices and/or other entertainment devices such as network-enabled televisions, set-top boxes, media players, cameras, and/or personal video recorders (PVRs) (e.g., (e.g., 104(5)), represented graphically as a gamepad), automotive computers such as vehicle control systems, vehicle security systems, and/or electronic keys for vehicles (e.g., 104(N), represented graphically as an automobile), desktop computers, and/or integrated components for inclusion in computing devices, appliances, and/or other computing device(s) configured to participate in and/or carry out computational-model training and/or operation as described herein.

In some examples, as indicated, computing device(s), e.g., computing devices 102 and 104, can intercommunicate to participate in and/or carry out computational-model training and/or operation as described herein. For example, a computing device 104 can be a query and/or data source and computing device 102 can be a computational-model training system, as described below with reference to, e.g., FIGS. 2-8.

Different devices and/or types of computing devices 102 and 104 can have different needs and/or ways of interacting with distributed computing resources 106. For example, computing devices 104 can interact with distributed computing resources distributed computing resources 106 with discrete request/response communications, e.g., for responses and/or updates using an already-trained model. Additionally and/or alternatively, computing devices 104 can be query and/or data sources and can interact with distributed computing resources distributed computing resources 106 with discrete and/or ongoing transmissions of data to be used as input to a computational model. This can provide improved accuracy by increasing the number or queries and/or amount of data input to the model. Additionally and/or alternatively, computing devices 104 can be data sinks and can interact with distributed computing resources 106 with discrete and/or ongoing requests for data output from a computational model.

In some examples, computing devices 102 and/or 104 can communicate with each other and/or with other computing devices via one or more network(s) 108. In some examples, computing devices 102 and 104 can communicate with external devices via network(s) 108. For example, network(s) 108 can include public networks such as the Internet, private networks such as an institutional and/or personal intranet, and/or combination(s) of private and public networks. Private networks can include isolated networks not connected with other networks, such as MODBUS, FIELDBUS, and/or Industrial Ethernet networks, etc. Private networks can also include networks connected to the Internet and/or other public network(s) via network address translation (NAT) devices, firewalls, network intrusion detection systems, and/or other devices that restrict and/or control the types of network packets permitted to flow between the private network and the public network(s).

Network(s) 108 can also include any type of wired and/or wireless network, including but not limited to local area networks (LANs), wide area networks (WANs), satellite networks, cable networks, Wi-Fi networks, WiMAX networks, mobile communications networks (e.g., 3G, 4G, and so forth) and/or any combination thereof. Network(s) 108 can utilize communications protocols, such as, for example, packet-based and/or datagram-based protocols such as Internet Protocol (IP), Transmission Control Protocol (TCP), User Datagram Protocol (UDP), other types of protocols, and/or combinations thereof. Moreover, network(s) 108 can also include a number of devices that facilitate network communications and/or form a hardware infrastructure for the networks, such as switches, routers, gateways, access points, firewalls, base stations, repeaters, backbone devices, and the like. Network(s) 108 can also include devices that facilitate communications between computing devices 102 and/or 104 using bus protocols of various topologies, e.g., crossbar switches, INFINIBAND switches, and/or FIBRE CHANNEL switches and/or hubs.

In some examples, network(s) 108 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), other standards, e.g., BLUETOOTH, cellular-telephony standards such as GSM, LTE, and/or WiMAX.

Different networks have different characteristics, e.g., bandwidth, latency, accessibility (open, announced but secured, and/or not announced), and/or coverage area. The type of network 108 used for any given connection between, e.g., a computing device 104 and distributed computing resources 106 can be selected based on these characteristics and on the type of interaction.

Still referring to the example of FIG. 1, details of an example computing device 102(3) are illustrated at inset 110. The details of example computing device 102(3) can be representative of others of computing device(s) 102. However, each of the computing device(s) 102 can include additional or alternative hardware and/or software components. The illustrated computing device 102 can include one or more processing unit(s) 112 operably connected to one or more computer-readable media 114, e.g., memories, such as via a bus 116, which in some instances can include one or more of a system bus, a data bus, an address bus, a Peripheral Component Interconnect (PCI) Express (PCIe) bus, a PCI bus, a Mini-PCI bus, and any variety of local, peripheral, and/or independent buses, and/or any combination thereof. In some examples, plural processing unit(s) 112 can exchange data through an internal interface bus (e.g., PCIe), rather than and/or in addition to network 108. While the processing unit(s) 112 are described as residing on the computing device 102(3), in this example, the processing unit(s) 112 can also reside on different computing device(s) 102 and/or 104 in some examples. In some examples, at least two of the processing unit(s) 112 can reside on different computing device(s) 102 and/or 104. In such examples, multiple processing unit(s) 112 on the same computing device 102 and/or 104 can use a bus 116 of the computing device 102 and/or 104 to exchange data, while processing unit(s) 112 on different computing device(s) 102 and/or 104 can exchange data via network(s) 108.

Computer-readable media described herein, e.g., computer-readable media 114, includes computer storage media and/or communication media Computer storage media includes tangible storage units such as volatile memory, nonvolatile memory, and/or other persistent and/or auxiliary computer storage media, removable and non-removable computer storage media implemented in any method and/or technology for storage of information such as computer-readable instructions, data structures, program modules, and/or other data. Computer storage media includes tangible and/or physical forms of media included in a device and/or hardware component that is part of a device and/or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards and/or other optical storage media, magnetic cassettes, magnetic tape, magnetic disk storage, magnetic cards and/or other magnetic storage devices and/or media, solid-state memory devices, storage arrays, network attached storage, storage area networks, hosted computer storage and/or memories, storage, devices, and/or storage media that can be used to store and maintain information for access by a computing device 102 and/or 104.

In contrast to computer storage media, communication media can embody computer-readable instructions, data structures, program modules, and/or other data in a modulated data signal, such as a carrier wave, and/or other transmission mechanism. As defined herein, computer storage media does not include communication media.

In some examples, computer-readable media 114 can store instructions executable by the processing unit(s) 112 that, as discussed above, can represent a processing unit incorporated in computing device 102. Computer-readable media 114 can additionally and/or alternatively store instructions executable by external processing units such as by an external central processing unit (CPU) and/or external processor of any type discussed herein. In some examples at least one processing unit 114, e.g., a CPU, graphics processing unit (GPU), and/or hardware logic device, can be incorporated in computing device 102, while in some examples at least one processing unit 114, e.g., one or more of a CPU, GPU, and/or hardware logic device, can be external to computing device 102.

Computer-readable media 114 can store, for example, computer-executable instructions of an operating system 118, module(s) of a training engine 120, module(s) of an operation engine 122, and/or other modules, programs, and/or applications that are loadable and executable by processing unit(s) 112. In some examples not shown, one or more of the processing unit(s) 112 in one of the computing device(s) 102 and/or 104 can be operably connected to computer-readable media 114 in a different one of the computing device(s) 102 and/or 104, e.g., via communications interface and network 108. For example, program code to perform steps of flow diagrams herein, e.g., as described herein with reference to operation engine 122, can be downloaded from a computing device 102 operating as a server to a computing device 104 operating as a client, e.g., via the network 108, and executed by one or more processing unit(s) in computing device 104. For example, the computer-executable instructions stored on the computer-readable media 114 can upon execution configure a computer such as a computing device 102 and/or 104 to perform operations described herein with reference to the operating system 118, the training engine 120, and/or the operation engine 122.

Computer-readable media 114 can also store, for example, one or more computational model(s) 124, individually and/or collectively referred to herein with reference 124. The computational model(s) 124 include, e.g., one or more neural networks (NNs), recurrent neural networks (RNNs) e.g., a multi-domain model and/or an end-to-end dialogue agent model 126. Example RNNs can include long short-term memory (LSTM) units, long short-term memory look around (LSTM-LA) units, or bi-directional long short-term memory (bLSTM) units, with or without look around, RNN architectures including gated recurrent units (RNN-GRU), and/or any combination thereof. As noted above, the computational models 124 can include, e.g., activation weights, functions, and/or thresholds (collectively "parameters") for artificial neurons and/or other computational units (e.g., LSTM units) of one or more neural networks. The training engine 120 and/or the operation engine 122 can determine values of parameters computational models 124 and can use the determined parameters values of computational model 124 to perform data analysis and/or processing.

Processing unit(s) 112 can be and/or include one or more single-core processors, multi-core processors, CPUs, GPUs, GPGPUs, and/or hardware logic components configured, e.g., via specialized programming from modules and/or APIs, to perform functions described herein. For example, and without limitation, illustrative types of hardware logic components that can be used in and/or as processing unit(s) 112 include Field-Programmable Gate Arrays (FPGAs), Application-Specific Integrated Circuits (ASICs), Application-Specific Standard Products (ASSPs), System-on-a-Ship systems (SOCs), Complex Programmable Logic Devices (CPLDs), Digital Signal Processors (DSPs), and other types of customizable processors. For example, a processing unit 114 can represent a hybrid device, such as a device from ALTERA and/or XILINX that includes a CPU core embedded in an FPGA fabric. These and/or other hardware logic components can operate independently and/or, in some instances, can be driven by a CPU. In some examples, at least some of computing device(s) 102 and/or 104 can include a plurality of processing unit(s) 112 of multiple types. For example, the processing unit(s) 112 shown in computing device 102(3) can be a combination of one or more CPUs, GPGPUs, FPGAs, etc. Different processing unit(s) 112 can have different execution models, e.g., as is the case for graphics processing units (GPUs) and central processing unit (CPUs).

Computing device 102 can also include one or more communications interfaces 128 connected via the bus 116 to processing unit(s) 112 to enable wired and/or wireless communications between computing device(s) 102 and other networked computing devices 102 and/or 104 involved in end-to-end memory network for contextual, e.g., multi-turn, language understanding, and/or other computing device(s), e.g., over network(s) 108. Such communications interface(s) 128 can include one or more transceiver devices, e.g., network interface controllers (NICs) such as Ethernet NICs and/or other types of transceiver devices, to send and receive communications over a network. The processing unit(s) 112 can exchange data through respective communications interface(s) 128. In some examples, the communications interface 128 can include a PCI Express (PCIe) transceiver, and the network 108 can include a PCIe bus. In some examples, the communications interface 128 can include, but is not limited to, a transceiver for cellular (3G, 4G, and/or other), WI-FI, Ultra-wideband (UWB), BLUETOOTH, and/or satellite transmissions. The communications interface 128 can include a wired I/O interface, such as an Ethernet interface, a serial interface, a Universal Serial Bus (USB) interface, an INFINIBAND interface, and/or other wired interfaces. The communications interface 128 can additionally and/or alternatively include one or more user-interface devices, buses such as memory buses and/or local buses, memory interfaces, and/or hardwired interfaces such as 0-20 mA control lines. For simplicity, these and other components are omitted from the illustrated computing device 102(3).

As noted above, computer-readable media 114 of the computing device 102 can store an operating system 118. In some examples, an operating system 118 is not used (commonly referred to as a "bare metal" configuration). In some examples, the operating system 118 can include components that enable and/or direct the computing device 102 to receive data via various inputs (e.g., user controls, network and/or communications interfaces, memory devices, and/or sensors), and process the data using the processing unit(s) 112 to generate output. The operating system 118 can further include one or more components that present the output (e.g., display an image on an electronic display, store data in memory, and/or transmit data to another computing device). The operating system 118 can enable a user, e.g., an engineer, to interact with the computing device 102 using a user interface. Additionally, the operating system 118 can include components that perform various functions generally associated with an operating system 118, e.g., storage management and internal-device management.

In some examples, computing device 102 can include a user interface 130 configured to permit a user, e.g., an engineer responsible for computing device 102(3), distributed computing resources 106, environment 100 and/or a neural-network administrator, to operate the training engine 120, the operation engine 122, and/or the model(s) 124 including the end-to-end dialogue agent model 126. Some examples of user interface 130 are discussed below.

Details of an example computing device 104(1) are illustrated at inset 132. The details of example computing device 104(1) can be representative of others of computing device(s) 104. However, each of the computing device(s) 104 can include additional and/or alternative hardware and/or software components. Computing device 104(1) can include one or more processing unit(s) 134 operably connected to one or more computer-readable media 136, e.g., via a bus 138. Some examples of processing unit(s) 134 are discussed above with reference to processing unit(s) 112. Some examples of computer-readable media 136 are discussed above with reference to computer-readable media 114. For example, computer-readable media 136 can include one or more computer storage media. Some examples of bus 138 are discussed above with reference to bus 116.

Computer-readable media 136 can store, for example, computer-executable instructions of an operating system 140, and/or other modules, programs, and/or applications 142 that are loadable and executable by processing unit(s) 134. Other applications in applications 142 can be operable with or optimized for contextual, e.g., multi-turn, language understanding, such as dialogue agent application 144, which can represent a virtual personal assistant. Some examples of operating system 140 are discussed above with reference to inset 110.

In some examples, the computing device 104 can be configured to communicate with distributed computing resources 106 and/or computing device(s) 102 to operate an end-to-end dialogue agent model 126 and/or other computational model 124. For example, the computing device 104 can transmit a request, e.g., from dialogue agent 144, to distributed computing resources 106 and/or computing device(s) 102 for an output of the end-to-end dialogue agent model 126 and/or other computational model(s) 124, receive a response, and take action based on that response. In some examples, functions described herein can be shared between one or more computing device(s) 102 and one or more computing device(s) 104. For example, the computing device(s) 104 can operate an input layer of one or more neural network(s) and the distributed computing resources 106 and/or computing device(s) 102 can operate a hidden layer of one or more neural network(s).

Computing device 104 can also include one or more communications interfaces 146 connected via the bus 138 to processing unit(s) 134 to enable wired and/or wireless communications between computing device(s) 104 distributed computing resources 106 and/or and other networked computing devices 102 and/or 104 involved in end-to-end memory network for contextual, e.g., multi-turn, language understanding, and/or other computing device(s), over network(s) 108. Some examples are discussed above with reference to communications interface(s) 128.

In some examples, computing device 104 can include a user interface 148. For example, computing device 104(4) can provide user interface 148 to control and/or otherwise interact with distributed computing resources 106 and/or computing devices 102. For example, processing unit(s) 134 can receive inputs of user actions via user interface 148 and transmit corresponding data via communications interface(s) 146 to computing device(s) 102.

User interface 130 and/or 148 can include one or more input devices, integral and/or peripheral to computing device 102 and/or 104. The input devices can be user-operable, and/or can be configured for input from other computing device 102 and/or 104. Examples of input devices can include, e.g., a keyboard, keypad, a mouse, a trackball, a pen sensor and/or smart pen, a light pen and/or light gun, a game controller such as a joystick and/or game pad, a voice input device such as a microphone, voice-recognition device, and/or speech-recognition device, a touch input device such as a touchscreen, a gestural and/or motion input device such as a depth camera, a grip sensor, an accelerometer, another haptic input, a visual input device such as one or more cameras and/or image sensors, and the like. User interfaces 130 and/or 148 can include one or more output devices configured for communication to a user and/or to another computing device 102 and/or 104. Output devices can be integral and/or peripheral to computing device 102 and/or 104. Examples of output devices can include a display, a printer, audio speakers, beepers, and/or other audio output devices, a vibration motor, linear vibrator, and/or other haptic output device, and the like.

Illustrative Components

Figure 2:
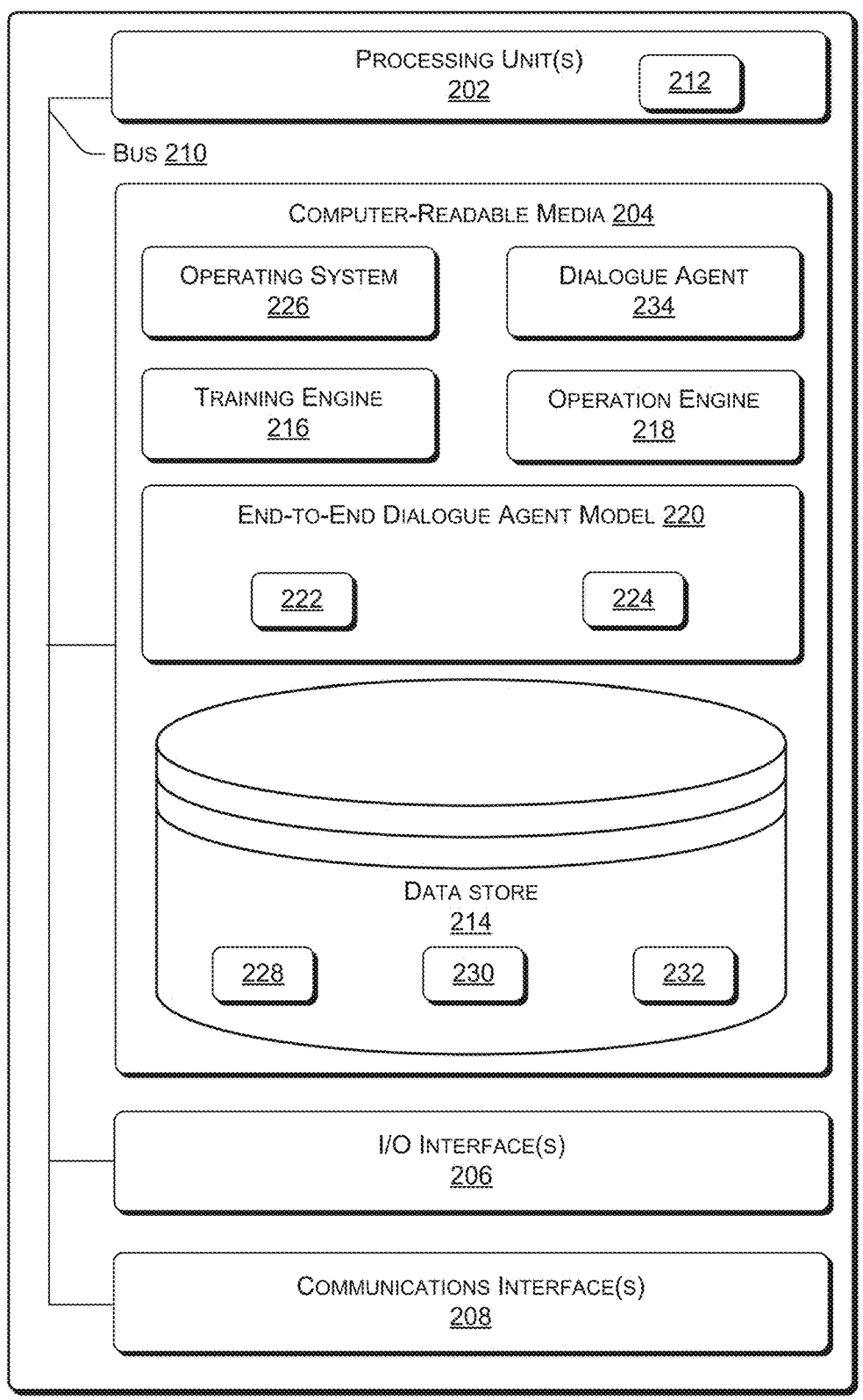
FIG. 2 is a block diagram depicting an example computing device configured to participate in training and operation of computational models for end-to-end learning of dialogue agents for information access according to various examples described herein.

FIG. 2 is an illustrative diagram that shows example components of a computing device 200, which can represent computing device(s) 102 and/or 104, and which can be and/or implement an end-to-end learning dialogue agent for information access, device, and/or apparatus, according to various examples described herein. Example computing device 200 includes one or more processing unit(s) 202, computer-readable media 204, input/output interface(s) 206, and network interface(s) 208. The components of computing device 200 are operatively connected, for example, via a bus 210. These components can represent corresponding components from device(s) 102 a. e.g., processing unit(s) 202 can represent processing unit(s) 112, bus 210 can represent bus 116, etc.

In example computing device 200, processing unit(s) 202 may correspond to processing unit(s) 122, and can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc. In some examples, processing unit(s) 202 can include and/or be connected to a memory 212, e.g., a RAM and/or cache.

Computer-readable media 204 may correspond to computer-readable media 124, and can store instructions executable by the processing unit(s) 202. Computer-readable media 204 can also store instructions executable by external processing units such as by an external CPU, an external GPU, and/or executable by an external accelerator, such as an FPGA type accelerator, a DSP type accelerator, or any other internal or external accelerator. In various examples at least one CPU, GPU, and/or accelerator is incorporated in computing device 20X), while in some examples one or more of a CPU, GPU, and/or accelerator is external to computing device 200.

Computer-readable media 204 can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Input/output (I/O) interfaces 206 allow computing device 200 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like).

Network interface(s) 208, which can represent communications interface(s) 128, can represent, for example, network interface controllers (NICs) or other types of transceiver devices to send and receive communications over a network.

In the illustrated example, computer-readable media 204 includes a data store 214. In some examples, data store 214 includes data storage such as a KB, data warehouse, or other type of structured or unstructured data storage. In some examples, data store 214 includes a corpus, a KB, and/or a relational database with one or more tables, indices, stored procedures, and so forth to enable data access including one or more of hypertext markup language (HTML) tables, resource description framework (RDF) tables, web ontology language (OWL) tables, and/or extensible markup language (XML) tables, for example. Data store 214 can store data for the operations of processes, applications, components, and/or modules stored in computer-readable media 204 and/or executed by processing unit(s) 202 and/or accelerator(s).

Computing device 200 can implement a training engine 216, which generally performs training offline and can represent training engine 120. FIG. 1. Computing device 200 can implement an operation engine 218, which generally operates online and can represent operation engine 122, FIG. 1. Computing device 200 can implement an end-to-end dialogue agent model 220, which is generally updated incrementally and can represent end-to-end dialogue agent model 126, FIG. 1. Computing device 200 can include and/or be included in a system and/or device for training and/or operating a neural network and/or other computational model as described herein.

In some examples, computer-readable media 204 of the computing device 200 can represent computer-readable media 114, FIG. 1, and can store a plurality of modules of the training engine 216, the operation engine 218, and/or the end-to-end dialogue agent model 220. In various examples, the end-to-end dialogue agent model 220 can be configured to have embeddings 222 and/or context 224 as part of the model based on updates of the end-to-end dialogue agent model 220. Processing unit(s) 202 can be configured to execute modules of the plurality of modules. For example, the computer-executable instructions stored on the computer-readable media 204 can upon execution configure a computer such as a computing device 200 to perform operations described herein with reference to the modules of the plurality of modules. The modules stored in the computer-readable media 204 can include instructions that, when executed by the one or more processing units 202, cause the one or more processing units 202 to perform operations described below. Examples of modules in computer-readable media 204 are discussed below. Computer-readable media 204 can also include an operating system 226, which can represent operating system 118, e.g., as discussed above. Computer-readable media 204 can be computer storage media, as discussed above.

In the illustrated example, computer-readable media 204 includes a data store 214. In some examples, data store 214 can include data storage, structured and/or unstructured, such as a KB (e.g., a Structured Query Language, SQL, and/or NoSQL KB) and/or data warehouse. In some examples, data store 214 can include a corpus and/or a relational KB with one or more tables, arrays, indices, stored procedures, and so forth to enable data access. Data store 214 can store data for the operations of processes, applications, components, and/or modules stored in computer-readable media 204 and/or computer instructions in those modules executed by processing unit(s) 202. In some examples, the data store can store computer program instructions 228 (e.g., instructions corresponding to processes described herein and/or to other software executable by processing unit(s) 202), one or more computational models 230, which can represent computational models 126, FIG. 1, training data 232, e.g., datasets, to be used for training and/or operation of the computational models 230, metadata, e.g., of data domains (discussed below), KB schema(s), and/or any combination thereof. In some examples, computer-readable media 204 can store computer program instructions 234 (e.g., instructions corresponding to processes described herein and/or to other software executable by processing unit(s) 202), for one or more dialogue agents 234, which can represent dialogue agent 144, FIG. 1.

Computing device 200 can exchange data with computing devices 102 and/or 104 (e.g., laptops, computers, and/or servers) via one or more network(s) 108, such as the Internet. In some examples, computing device 200 can receive data from one or more data source(s) (not shown) via one or more network(s) 108. Example data source(s) can include computing devices 102 and/or 104, sensors, data aggregators, and/or data feeds, e.g., via application programming interfaces (APIs). The processing units 202 can retrieve data from the data source(s), e.g., via an HTTP request such as a GET to a Web Services and/or Representational State Transfer (REST) API endpoint.

In some examples, the processing unit(s) 202 can access the module(s) on the computer-readable media 204 via bus 210, which can represent bus 116, FIG. 1. I/O interface 206 and communications interface 208 can also communicate with processing unit(s) 202 via bus 210.

The modules of the training engine 216 stored on computer-readable media 204 can include one or more modules, e.g., shell modules and/or API modules, for training neural networks such as generalized linear models, kernel machines, multi-layer perceptrons, RNN, LSTM, LSTM-LA, bLSTM, GRU, etc.

The modules of the operation engine 218 stored on computer-readable media 204 can include one or more modules, e.g., shell modules and/or API modules, for operating neural networks such as RNN, LSTM, LSTM-LA, bLSTM, GRU, etc.

In the training engine 216 and/or the operation engine 218, the number of modules can vary higher and/or lower, and modules of various types can be used in various combinations. For example, functionality described associated with the illustrated modules can be combined to be performed by a fewer number of modules and/or APIs and/or can be split and performed by a larger number of modules and/or APIs.

Figure 3:
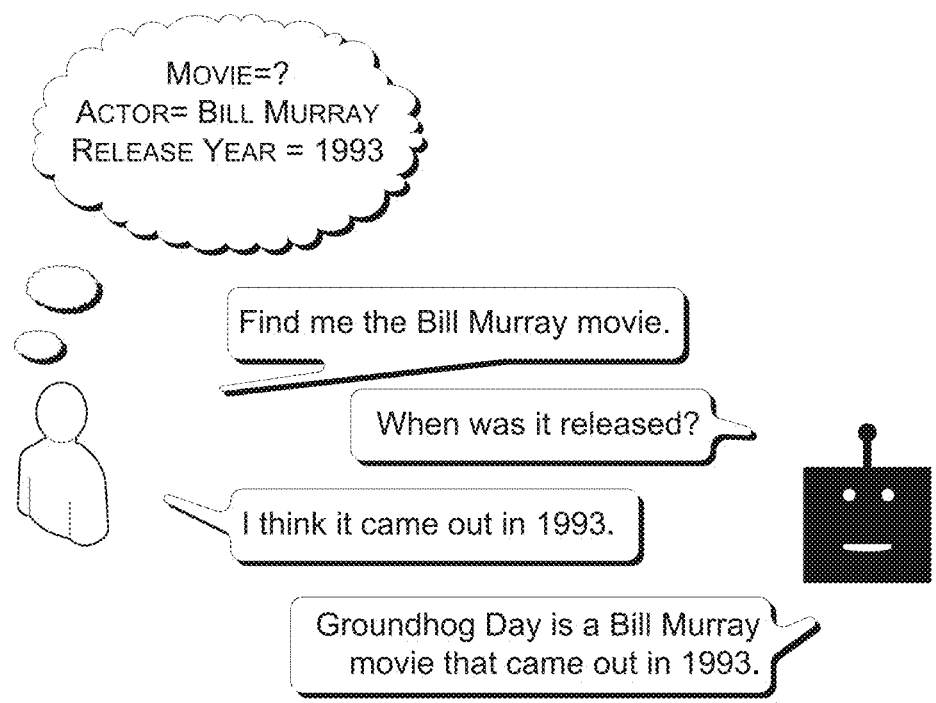
FIG. 3 is a dialogue example between a user looking for a movie and the dialogue agent. e.g., KB-InfoBot to illustrate an interaction according to various examples described herein.

FIG. 3 shows a dialogue example between a user looking for a movie and an improved dialogue agent, e.g., KB-InfoBot to illustrate an interaction according to various examples described herein. In this and other examples the improved dialogue agent employs a probabilistic framework for querying a KB given the agent's beliefs over the slots and/or attributes in the KB.

Interaction 300 illustrates an example dialogue between a user searching for a movie and an example of an improved dialogue agent as described herein. Interaction 300 shows the user thinking a series of facts, and initiating a dialogue with an example of an improved dialogue agent as described herein. "Find me a Bill Murray movie." The example improved dialogue agent accesses a KB with head entities of movies and responds with a prompt for specific additional information in order to ascertain which entity from the KB would provide an appropriate response, "When was it released?" The user responds, "I think it came out in 1993." Based on the pieces of information the improved dialogue agent has obtained, it can reply to the user. "Groundhog Day is a Bill Murray movie which came out in 1993."

FIGS. 4A and 4B represent a small example excerpt from an entity-centric knowledge base, where head entities are movies. FIG. 4A illustrates a conventional (h, r, t) format. FIG. 4B illustrates a table format in which missing values are denoted by X.

A Knowledge Base consists of triples of the form (h, r, t), which denotes that relation r holds between the head h and tail t. The dialogue agent, e.g., KB-InfoBot accesses a domain-specific entity-centric knowledge base (EC-KB) where head entities are of a particular type, and the relations correspond to attributes of these head entities. Examples of the head-entity type can include movies, persons, academic papers, flights, etc. Such a KB can be converted to a table format as shown in FIG. 4B whose rows correspond to the unique head entities, columns correspond to the unique relation types (slots from here on), and some of the entries may be missing as designated by X.

In various examples, the following notations and assumptions have been employed for the examples of an improved dialogue agent and dialogue system as described herein.

The improved dialogue system described herein can let $\mathcal{T}$ denote the KB table described above and $\mathcal{T}_{i,j}$ denote the jth slot-value of ith entity. $1 \le i \le N$ and $1 \le j \le M$. The improved dialogue system described herein can let $V^j$ denote the vocabulary of each slot, i.e. the set of all distinct values in j-th column. The improved dialogue system described herein can denote missing values from the table with a special token and write $\mathcal{T}_{i,j}=\Psi$. $M_j=\{i: \mathcal{T}_{i,j}=\Psi\}$ denotes the set of entities for which the value of slot j is missing. Note that the requesting user may know the actual value of $\mathcal{T}_{i,j}$, and the improved dialogue system described herein can assume this lies in $V^j$. Hence, the improved dialogue system described herein need not deal with Out Of Vocabulary entities or relations at test time.

The goal of the requesting user can be sampled uniformly $G \times U[\{1, \ldots N\}]$ and can point to a particular row in the table $\mathcal{T}$. The improved dialogue system described herein can also sample binary random variables $\Phi_j \in \{0, 1\}$) to indicate whether the requesting user knows the value of slot j or not. The improved dialogue agent can maintain M multinomial distributions for its belief over user goals given user utterances $U_1^t$ until turn t. A slot distribution $p_j^t(v)$ for $v \in V^j$ is the probability at turn t that the user constraint for slot j is v. The agent also can maintain M binomials $q_j^t = Pr(\Phi_j=1)$ which can denote the probability that the user does not know the value of slot j.

The improved dialogue system described herein can also assume that column values are independently distributed to each other. This is a strong assumption but can allow the improved dialogue system to model the user goal for each slot independently, as opposed to modeling the user goal over KB entities directly. Typically, $\max_j |V^j| < N$ and hence this assumption makes the problem more scalable.

The improved dialogue system described herein can let the posterior probability at turn t that the user is interested in row i of the table, given the utterances be $p\mathcal{T}'(G=i|U_1^t)$ The improved dialogue system described herein can assume probabilities, in some examples all probabilities, are conditioned on user inputs $U_1^t$ and drop the user input from the notation below. From an assumption of independence of slot values the improved dialogue system described herein can arrive at equation 2:

$$p_{\mathcal{T}}^t(G = i) \propto \prod_{j=1}^{M} Pr(G_j = i), \qquad (2)$$

where $Pr(G_j=i)$ denotes the posterior probability of user goal for slot j pointing to $\mathcal{T}_{i,j}$. The improved dialogue system described herein can marginalize this over $\Phi_j$ to get equation 3:

$$Pr(G_j = i) = \sum_{\phi=0}^{1} Pr(G_j = i, \Phi_j = \phi) \qquad (3)$$
$$= q_j^t Pr(G_j = i | \Phi_j = 1) +$$
$$(1 - q_j^t) Pr(G_j = i | \Phi_j = 0).$$

For $\Phi_j=1$, the user does not know the value of the slot, hence the improved dialogue system described herein can assume a uniform prior over the rows of $\mathcal{T}$ as shown in equation 4:

$$Pr(G_j = i | \Phi_j = 1) = \frac{1}{N}, 1 \le i \le N \qquad (4)$$

For $\Phi_j=0$, the requesting user may know the value of slot j, but this may be missing from T. and the improved dialogue system described herein can again have two cases as shown in equation 5:

$$Pr(G_j = i \mid \Phi_j = 0) = \begin{cases} \frac{1}{N}, & i \in M_j \\ \frac{p_v^t(v)}{\#_j v}\left(1 - \frac{|M_j|}{N}\right), & i \notin M_j \end{cases} \quad (5)$$

Here $p_j^t(v)$ is the slot distribution from the belief tracker, and $\#_j v$ is the count of value v in slot j. The derivation for equation 5 is provided after the discussion of equation 19, below.

Combining equations (2), (3), (4), and (5) can summarize the procedure for computing the posterior over KB entities.

Figure 5:
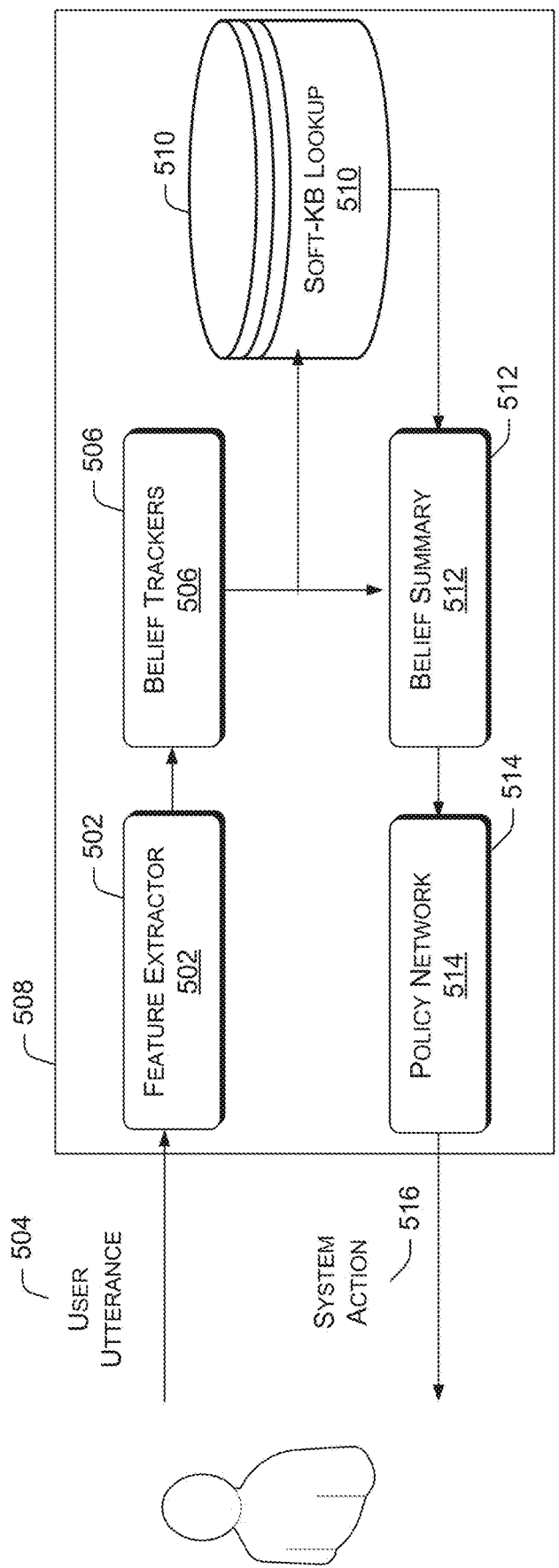
FIG. 5 is a high-level overview of the end-to-end dialogue agent, e.g., KB-InfoBot in which some components are trainable.

FIG. 5 is a high-level overview of an improved end-to-end dialogue agent, e.g., KB-InfoBot, as described herein in which some components are trainable. At each turn, the improved dialogue agent can receive a natural language utterance $u^t$ as input, and can select an action $a^t \in A$ as output. The action space A can include M+1 actions—request (slot=i) for $1 \leq i \leq M$ can ask the user for the value of slot i, and inform(I) can inform the user with an indexed set of results I from the KB. The dialogue can end once the improved dialogue agent chooses inform. Description of each of the components follows.

Feature Extractor 502: A feature extractor 502 can convert user input $u^t$, e.g., user utterance 504, into a vector representation $x^t$. In various example implementation the improved dialogue system described herein can use a simple bag of n-grams (e.g., with n=2) representation where each element of $x^t$ is an integer indicating the count of a particular n-gram in $u^t$. The improved dialogue system described herein can let $V^n$ denote the number of unique n-grams, hence $x^t \in \mathbb{R}^{V^n}$.

Belief Tracker 506: A dialogue agent, e.g., KB-InfoBot 508, can include M belief trackers 506, e.g., one for each slot, each of which can have input $x^t$ and can produce two outputs, which can collectively be called the belief state—a multinomial over the slot values $p_j^t(V)$ and a scalar probability of the user not knowing the value of that slot $q_j^t$. Recurrent neural networks work well for belief tracking since the output distribution at turn t depends on all user inputs until that turn. Examples of the improved dialogue system described herein can use a Gated Recurrent Unit (GRU), in some examples for each tracker, which, starting from $h_j^0=0$ maintains a summary state $h_j^t$ as follows in equation 6:

$r_j^t = \sigma(W_j^r x^t + U_j^r h_j^{t-1} + b^r)$ $z_j^t = \sigma(W_j^z x^t + U_j^z h_j^{t-1} + b^z)$ $\tilde{h}_j^t = \tan h(W_j^h x^t + U_j^h (r_j^t \cdot h_j^{t-1}) + b^r)$ $h_j^t = (1-z_j^t) \cdot h_t^{t-1} + z_j^t \cdot \tilde{h}_j^t$ (6)

Here, r and z can be called the reset and update gates respectively, $\tilde{h}$ the candidate output, and the subscript j and superscript t stand for the tracker index and dialogue turn respectively, σ can denote the sigmoid nonlinearity. The trainable parameters can include $W_j^r$, $W_j^z$, $W_j^h$ which are $d \times V^n$ matrices, $U_j^r$, $U_j^z$, $U_j^h$ which are $d \times d$ matrices, and $b^r$, $b^z$, $b^h$ which are $d \times 1$ vectors. The output $h_j^t \in \mathbb{R}^d$ can be interpreted as a summary of what the user has said about slot until turn t. The belief states can be computed from this vector as follows in equations 7 and 8:

$p_j^t = \text{softmax}(W_j^p h_j^t + b_j^p)$ (7)

$q_j^t = \sigma(W_j^\Phi h_j^t + b_j^\Phi)$ (8)

Here $W_j^p \in \mathbb{R}^{V^j \times d}$, $b_j^p \in \mathbb{R}^{V^j}$, $W_j^\Phi \in \mathbb{R}^d$ and $b_j^\Phi \in \mathbb{R}$, can any or all be trainable parameters.

Example differences between the belief tracker described here and another in the art include: (1) the belief tracker described herein can model the probability that user does not know the value of a slot separately, as opposed to treating it as a special value for the slot, since this is a very different type of object; (2) the belief tracker described herein can use GRU units instead of a Jordan-type RNN, and use summary states $h_j^t$ instead of tying together RNN weights; (3) the belief tracker described herein can use n-gram features for simplicity instead of Convolutional Neural Network features.

Soft-KB Lookup 510: The soft-KB lookup module 510 can use the procedure described herein to compute the posterior over the EC-KB $p\mathcal{T}^t \in \mathbb{R}^N$ from the belief states above. Note that this can include a fixed differentiable operation without any trainable parameters.

Collectively, outputs of the belief trackers and the soft-KB lookup can be viewed as the current dialogue state internal to the dialogue agent, e.g., KB-InfoBot. Let $S^t = [p_1^t, p_2^t, \ldots, p_M^t, q_1^t, q_2^t, \ldots, q_M^t, p\mathbb{R}^t]$ be the vector of size $\Sigma_j V^j + M + N$ denoting this state.

Beliefs Summary 512: At this stage it is possible for the improved dialogue agent to directly use the state vector $S^t$ to select its next action at d. However, the large size of the state vector can lead to a large number of parameters in the policy network. To improve efficiency, the improved dialogue system described herein can extract summary statistics from the belief states.

For each slot, the improved dialogue system described herein can summarize the multinomial over slot-values into a weighted entropy statistic. The weights can be computed from elements of the KB posterior $p\mathcal{T}^t$ as follows in equation 9:

$$w_j^t(v) = -\sum_{i:\mathcal{T}_{i,j}=v} p_\mathcal{T}^t(i) + p_j^0 \sum_{i:\mathcal{T}_{i,j}=\Psi} p_\mathcal{T}^t(i) \quad (9)$$

Here $p_j^0$ is a prior distribution over the values of slot j, which the improved dialogue system described herein can estimate using counts of each value in the KB. Intuitively, there is a desire to weight the probability mass of v by the confidence of the improved dialogue agent that the goal of the requesting user has value v in slot j. This confidence is a sum of two terms—(1) sum of KB posterior probabilities of rows which have value v, and (2) sum of KB posterior probabilities of rows whose value is unknown, multiplied by the prior probability that an unknown might in fact be v. These two terms correspond to the two terms in equation 9. The improved dialogue system described herein can define the weighted probability distribution of slot-values as follows in equation 10:

$$\tilde{p}_j^t(v) \propto p_j^t(v) w_j^t(v) \quad (10)$$

The summary statistic for slot j can then be the entropy of this weighted probability distribution (after normalization) as shown in equation 11:

$$H(\tilde{p}_j^t) = -\sum_{v \in V^j} \tilde{p}_j^t(v) \log \tilde{p}_j^t(v) \quad (11)$$

The KB posterior $p\mathcal{T}^t$ can be summarized into a simple entropy measure as shown in equation 12:

$$H(\tilde{p}^t_j) = -\sum_{i=1}^{N} \tilde{p}^t_j(i)\log\tilde{p}^t_j(i) \quad (12)$$

The scalar probabilities of the user not knowing the value of a slot can be passed as is to the policy network. Hence, the final summary vector, which is input to the policy network, can be $\tilde{S}^t=[H(\tilde{p}_1^t), \ldots, H(\tilde{p}_M^t), q_1^t, \ldots, q_M^t, H(p\mathcal{T}^t)]$. Note that this vector can have size 2M+1.

Policy Network 514: In an improved dialogue system as described herein the job of a policy network 514 can be to select the next action based on the current summary state $\tilde{S}^t$ and the dialogue history. The improved dialogue system described herein can use a recurrent neural network to allow the network to maintain an internal state of dialogue history. Specifically, the improved dialogue system described herein can use a GRU unit (see equation 6) followed by fully-connected layer and/or softmax nonlinearity to model the policy as shown in equations 13 and 14:

$$h_\pi^t = GRU(\tilde{s}^1, \ldots, \tilde{s}^t) \quad (13)$$

$$\pi = \mathrm{softmax}(W^\pi h_\pi^t + b^\pi) \quad (14)$$

Here $W^\pi$ w is a A×d matrix and $b^\pi$ is a size A vector.

Action Selection 516: During the course of the dialogue, the improved dialogue agent described herein can sample its actions 516 from the policy x. If this action is inform( ), the improved dialogue agent described herein can, in some examples must, also provide an ordered set $I=(i_1, i_2, \ldots i_R)$ of R results from the KB to the user. Since the improved dialogue agent described herein can want to learn the KB posterior $p_T^t$ using reinforcement learning, the improved dialogue agent described herein can view it as another policy, and can sample results from the following distribution as shown in equation 15:

$$\mu(I) = p_T^t(i_1) \times \frac{p_T^t(i_2)}{1 - p_T^t(i_1)} \times \ldots \quad (15)$$

The next section describes an episodic REINFORCE objective that can be used to optimize both of the above policies.

The improved dialogue agent, e.g., KB-InfoBot described herein can sample system actions from the policy π and KB results from the distribution μ. This can allow the improved dialogue agent to explore both the space of actions A as well as the space of other, in some examples all possible, KB results. This formulation leads to a modified version of the episodic REINFORCE algorithm as described below.

One can write the future-discounted expected return of the improved dialogue agent under policy n as shown in equation 16:

$$J(\theta) = E\left[\sum_{h=0}^{H} \gamma^h r_h\right] \quad (16)$$

Here the expectation can be, and in some examples is, over all possible trajectories τ of the dialogue. θ can denote the parameters of the end-to-end system. H is the maximum length of an episode, γ is the discounting factor and $r_h$ the reward observed at turn h. An improved dialogue agent described herein can write the gradient of the objective as follows in equation 17:

$$\nabla_\theta J(\theta) = E\left[\nabla_\theta \log p_\theta(\tau)\sum_{h=0}^{H} \gamma^h r_h\right] \quad (17)$$

Where $p_\theta(T)$ is the probability of observing a particular trajectory under the current policy. With ah Markovian assumption an improved dialogue agent described herein can write $$p_\theta(\tau) = \left[p(s^0)\prod_{k=0}^{H} p(s^{k+1}|s^k, a^k)\pi_\theta(a^k|s^k)\right]\mu_\theta(I),$$

where the subscript can denote which distributions depend on the neural network parameters. Plugging this into equation 17 can obtain equation 18:

$$\nabla_\theta J(\theta) = E_{a\sim\pi, I\sim\mu}\left[\left(\nabla_\theta \log\mu(I) + \sum_{h=0}^{H} \nabla_\theta \log\pi(a_h)\right)\sum_{k=0}^{H} \gamma^k r_k\right] \quad (18)$$

This expectation can be estimated using a minibatch B of dialogues, and an improved dialogue agent as described herein can use stochastic gradient descent methods (e.g., RMSProp) to tune the parameters θ.

In theory, the belief trackers and the policy network can be trained from scratch using the reinforcement learning objective described above, in some examples only the reinforcement learning objective described above. In practice, for a moderately sized KB, even some examples of the improved dialogue agent described herein can fail when starting from random initialization. In this case credit assignment can also be difficult for the improved dialogue agent, since it does not know whether it is failing due to an incorrect sequence of actions or incorrect set of results from the KB. Hence, the beginning of training can include an imitation learning phase where the belief trackers and policy network can be trained to mimic a simple hand designed rule-based agent. The rule-based agent is described in detail in the next section, here the imitation learning objective used to bootstrap the dialogue agent, e.g., KB-InfoBot, is provided.

Assume that $\tilde{p}_j^t$ and $\hat{q}_j^t$ are the belief states from the rule-based agent, and $\hat{a}^t$ its action at turn t. Then the loss function during imitation learning phase is shown in equation 19:

$$\mathcal{T}(\theta) = E[D(\tilde{p}_j^t\|p_j^t) + H(\hat{q}_j^t\|q_j^t) - \log\pi(\hat{a}^t)], \quad (19)$$

where $D(p\|q)$ denotes the Kullback-Leibler divergence between p and q, and H(p, q) denotes the cross-entropy between p and q. The last term is a standard supervised cross-entropy loss between the rule-based agent's action and its probability in the dialogue agent, e.g., KB-InfoBot's policy. The expectation can be estimated as an average over the minibatch, and the improved dialogue system described herein can use standard Stochastic Gradient Descent to optimize the loss.

Posterior Derivation:

A derivation for equation 5, i.e. the posterior over the KB slot when the user knows the value of that slot. For brevity an improved dialogue agent as described herein can drop $\Phi_j=0$ from the condition in all probabilities below. For the case when t E $M_j$, an improved dialogue agent as described herein can write equation 20:

$$Pr(G_j = i) = Pr(G_j \in M_j)Pr(G_j = i \mid G_j \in M_j) \quad (20)$$
$$= \frac{M_j}{N}\frac{1}{M_j} = \frac{1}{N}$$

Where we assume all missing values to be equally likely, and estimate the prior probability of the goal being missing from the count of missing values in that slot.

For the case when i=v∈$M_j$ see equation 21:

$$Pr(G_j = i) = Pr(G_j \notin M_j)Pr(G_j = i \mid G_j \notin M_j) \quad (21)$$
$$= \left(1 - \frac{M_j}{N}\right) \times \frac{p_v^i(v)}{\#_j v}$$

Where the second term comes from taking the probability mass associated with v in the belief tracker and dividing it among all rows with value v.

In single-turn interactions deep learning-deep belief networks (DBNs) with deep neural networks (DNNs) have been applied to domain and intent classification. Deep learning has been viewed as a feature generator and the neural architecture has been merged with CRFs for slot filling. In single-turn interactions, an RNN architecture has been applied for intent determination, and RNNs have also been used for sequence labeling in order to perform slot filling. However, in single-turn interactions each input or utterance is treated independently.

Contextual information has proven useful for SLU modeling. For example, the first and second utterances of FIG. 3 may be followed by an utterance containing message further request, "where can I see it?", so keeping contextual knowledge increases the likelihood of the system correctly estimating a semantic slot message with the same intent. Previously, information from previous intra-session utterances have been incorporated into SLU tasks on a given utterance of the session by applying SVM-HMMs to sequence tagging, which obtained some improvement. Also, contextual information has been incorporated into an RNN to improve domain classification, intent prediction, and slot filling. However, most prior work exploited information only from the previous turn, ignoring long-term contexts. Another constraint is that the previous models required supervision at each layer of the network. Furthermore, there was no unified architecture to perform multi-turn SLU in an end-to-end framework.

Manipulating explicit storage and a notion of attention facilitates multiple complex computational steps and can model long-term dependencies in sequential inputs, e.g., utterances. In various examples described herein, storage is endowed with a continuous representation modeled by neural networks, in which the stored representations can be read and written to encode knowledge. As described herein, a recurrent neural network (RNN) architecture can read from external memory, in some examples a large external memory, before tagging a current input, e.g., utterance. The model training described herein does not require paired data for each layer of the network; that is, the end-to-end neural network model can be trained end-to-end directly from reinforcement signals (e.g., whether the user finds the conversation successful or not) without supervision to model long-term knowledge carryover for multi-turn SLU.

The model, e.g., model 220, can embed inputs, e.g., utterances, into a continuous space and store historic inputs, e.g., historic utterances, x embeddings to the memory. In various examples, the historic inputs model 220 can store, include all historic inputs from the source of the input and/or from other sources associated with the source of the input, e.g., family members of the source, coworkers of the source, other sources in geographical proximity to the source, other sources sharing a context with the source such as demographic contexts (age, gender, occupation, etc.), geolocation context, context from knowledge graph(s), context from search-engine logs, language context, and/or other contextual meta-information, etc. In some examples, the historic inputs model 220 can store, include all historic inputs to the model, without regard to the source of the input and/or all historic inputs to the model of sources who have authorized use of their inputs as inputs, without regard to the source of the input. In some examples, historic inputs can be weighted based on strength of association of source(s) with the source of current input.

The operation engine 218 can compare representation of the current utterance with memory representations to encode carried knowledge via an attention mechanism. In various examples, attention distribution can be based on embedding similarity. In some examples, the attention model can be replaced by a summary model, and/or other models that can exploit latent contextual information from memory. An RNN module can perform encoding. In various examples, the RNN module can include an include long short-term memory (LSTM) units, long short-term memory lookaround (LSTM-LA) units, or bi-directional long short-term memory (bLSTM) units, with or without look around, RNN architectures including gated recurrent units (RNN-GRU), and/or any combination thereof. In some examples, operation engine 218 can factor in time to smooth distribution of the models. The operation engine can use encoded knowledge and the word sequence to estimate the semantic tags. Four aspects of the operation are described below.

Illustrative Processes

Figure 6:
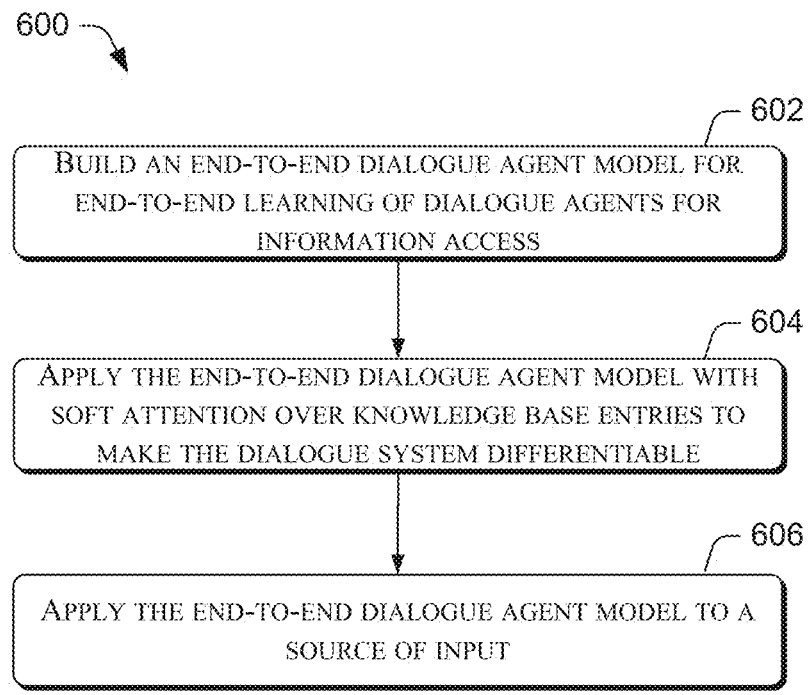
FIG. 6 is a flow diagram that illustrates example processes for training and operating computational models for end-to-end learning of dialogue agents according to various examples described herein.

FIG. 6 is a flow diagram that illustrates an example process 600 for training and operating computational models for end-to-end learning of dialogue agents for information access according to various examples described herein.

Figure 7:
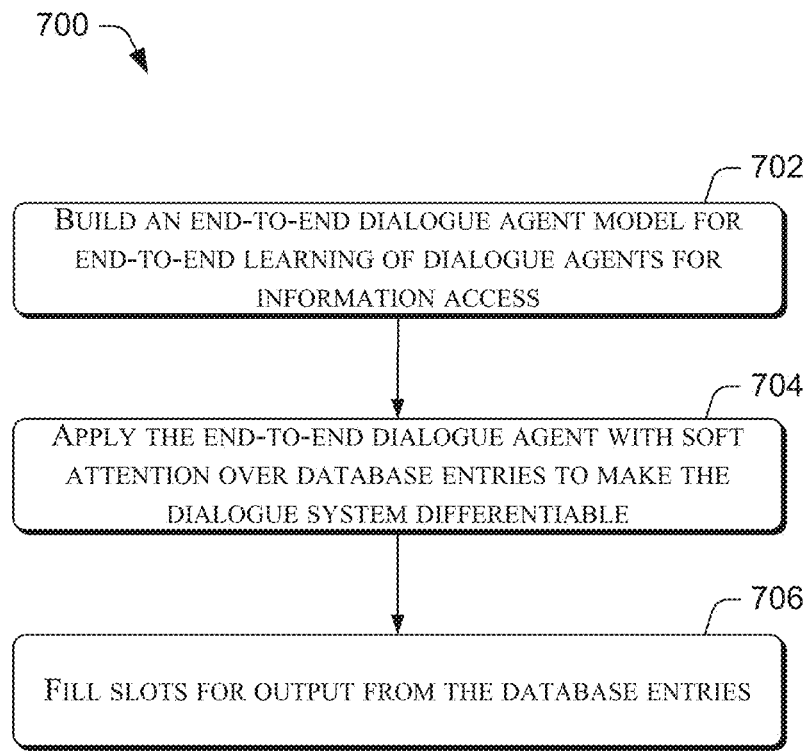
FIG. 7 is a flow diagram that illustrates example processes for training and operating computational models for end-toend learning of dialogue agents for information access according to various examples described herein.
Figure 8:
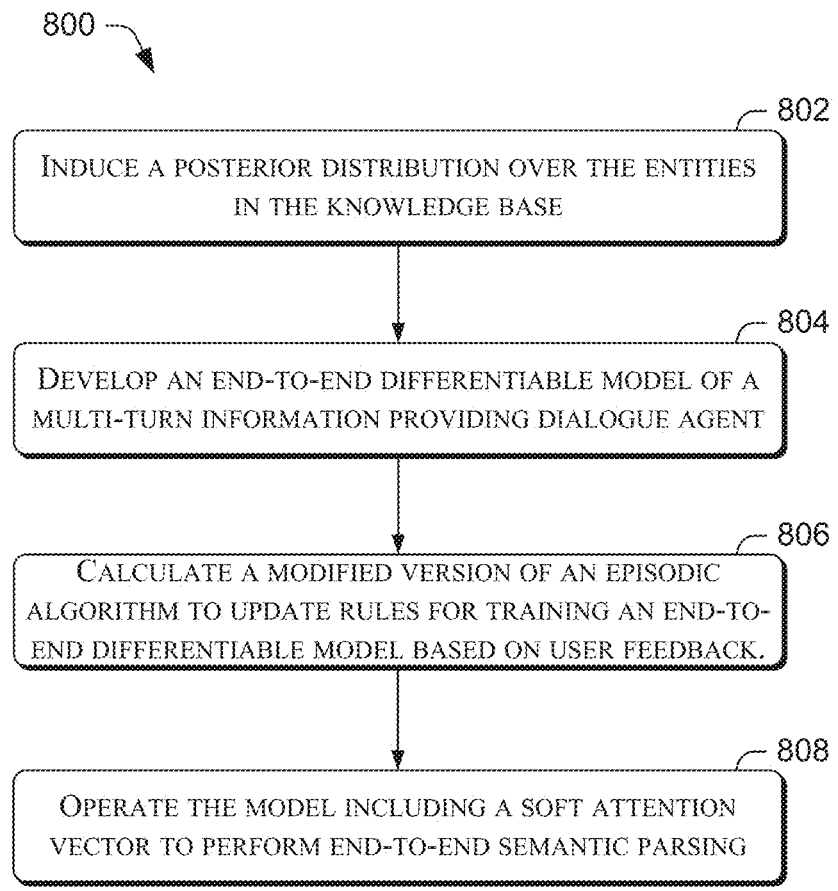
FIG. 8 is a flow diagram that illustrates example processes for operating computational models according to various examples described herein.

Example functions shown in FIGS. 6, 7, and 8 and example processes herein can be implemented by distributed computing resources 106 on and/or otherwise embodied in one or more computing device(s) 102 and/or 104, e.g., a computing device 200, e.g., using software running on such device(s). For the sake of illustration, the example process 600 is described below with reference to processing unit 202 and other components of computing device 200, FIG. 2, which can carry out and/or participate in the steps of the exemplary method. However, other processing unit(s) such as processing unit 112 and/or other components of computing device(s) 102 and/or 104 can carry out step(s) of described example processes such as process 600. Similarly, example method(s) shown in FIGS. 6, 7 and 8 are also not limited to being carried out by any specifically-identified components.

The order in which the operations are described in each example flow diagram and/or process is not intended to be construed as a limitation, and any number of the described operations can be combined in any order and/or in parallel to implement each process. Moreover, the operations in each of FIGS. 6, 7, and 8 can be implemented in hardware, software, and/or a combination thereof. In the context of software, the operations represent computer-executable instructions that, when executed by one or more processors, cause one or more processors to perform the recited operations. In the context of hardware, the operations represent logic functions implemented in circuitry, e.g., datapath-control and finite-state-machine sequencing functions.

In some examples, at block 602, a system as described herein can use a neural network (NN) to build an end-to-end memory network model for end-to-end learning of dialogue agents for information access. For example, processor 202 can execute training engine 216 offline and/or operation engine 218 online on multiple turns of input in order to build an end-to-end dialogue agent model 220, which can produce latent contextual information to be applied to later received turns of input, e.g., in a conversation between a requesting user and an improved dialogue agent. In examples, input can be received from one or more user interface(s), e.g., user interface 130/148, including input devices such as a physical keyboard, a soft keyboard, a touch screen, a touch pad, microphone(s), etc.

In some examples, at block 604, a system as described herein can apply the end-to-end dialogue agent model 220 with soft attention over KB entries to make the dialogue system differentiable. In various examples, a system as described herein can apply the end-to-end dialogue agent model 220 to multiple turns of input in a conversation between the requesting user and the improved dialogue agent. For example, processor 202 can execute operation engine 218 to apply end-to-end dialogue agent model 220 to a sequence of turns of input in order to determine an intent, e.g., for contextual information, and to fill slots for the turn of input and in some examples to fill slots for the output of the turn of input.

In some examples, at block 606, a system as described herein can apply the end-to-end dialogue agent model 220 across a plurality of sources of input. For example, processor 202 can execute operation engine 218 to fill slots for the output of the end-to-end dialogue agent model 220, e.g., language understanding and/or spoken language understanding, of the conversational input between the requesting user and the improved dialogue agent.

FIG. 7 is a flow diagram that illustrates example processes 700 for training and operating computational models according to various examples described herein.

In some examples, at block 702, a system as described herein can build an end-to-end dialogue agent model for end-to-end learning of dialogue agents for information access, e.g., using a neural network (NN). For example, processor 202 can execute training engine 216 offline and/or operation engine 218 online on multiple turns of input in order to build an end-to-end dialogue agent model 220, which can produce latent contextual information to be applied to later received turns of input, e.g., in a conversation between a requesting user and an improved dialogue agent.

In some examples, at block 704, a system as described herein can apply the end-to-end dialogue agent with soft attention over KB entries to make the dialogue system differentiable. In various examples, a system as described herein can apply the end-to-end dialogue agent model 220 to multiple turns of input in a conversation between the requesting user and the improved dialogue agent and/or to entries in a knowledge base to identify entities for output. For example, processor 202 can execute operation engine 218 to apply end-to-end dialogue agent model 220 to a sequence of turns of input in order to determine an intent, e.g., for contextual information. In some instances, processor 202 can execute operation engine 218 to apply end-to-end dialogue agent model 220 to fill slots for the turn of input and in some examples to fill slots for the output of the turn of input.

In some examples, at block 706, a system as described herein can fill slots for output of the turn of input based on the KB entries. For example, processor 202 can execute operation engine 218 to semantically parse relation and tail entries associated with head entities from a knowledge base.

FIG. 8 is a flow diagram that illustrates example process 800 for operating computational models according to various examples described herein.

In some examples, at block 802, a system as described herein can induce a posterior distribution over the entities in the knowledge base in an end-to-end memory network. For example, processor 202 can execute training engine 216 offline and/or operation engine 218 online in an end-to-end memory network to induce a posterior distribution over the entities in the knowledge base. In various examples a neural network architecture, which can include a recurrent neural network architecture, can read from the knowledge base, which can include utterances. End-to-end memory network model 220 can be applied to semantically parse later received input.

In some examples, at block 804, a system as described herein can develop an end-to-end differentiable model of a multi-turn information providing dialogue agent. For example, processor 202 can execute training engine 216 offline and/or operation engine 218 online to develop an end-to-end differentiable model of a multi-turn information providing dialogue agent for an end-to-end dialogue agent model 220.

In some examples, at block 806, a system as described herein can calculate a modified version of an episodic algorithm to update rules for training an end-to-end differentiable model based on user feedback. For example, processor 202 can execute operation engine 218 to semantically parse input received from one or more user interface(s), e.g., user interface 130/148, including input devices such as a physical keyboard, a soft keyboard, a touch screen, a touch pad, microphone(s), etc. and execute training engine 216 offline and/or operation engine 218 online to calculate a modified version of an episodic algorithm to update rules for training an end-to-end differentiable model based on user feedback.

In some examples, at block 808 a system as described herein can operate the end-to-end dialogue agent model 220 including a soft attention vector to perform end-to-end semantic parsing of inputs and/or posterior distribution over the knowledge base. For example, processor 202 can execute operation engine 218 to apply the end-to-end dialogue agent model 220 to perform end-to-end semantic parsing of inputs, such as inputs from a conversation, and in some examples including end-to-end tagging of inputs and/or tagging for slot-filling for outputs as a "soft" posterior distribution over the knowledge base that can indicate in which entities the requesting user is interested.

Experiments to evaluate the performance of the improved dialogue agent, e.g., KB-InfoBot made use of a rule-based stochastic simulated user. In various example implementations, at the beginning of each dialogue, the simulated user randomly sampled a target entity from the ECKB and a random combination of informable slots for which the simulated user knows the value of the target. The remaining slot-values are unknown to the simulated user. The simulated user initiated the dialogue by providing a subset of its informable slots to the improved dialogue agent and requested an entity that matched them. In subsequent turns, if the improved dialogue agent requested the value of a slot, the simulated user complied by providing the value of the slot or informed the agent that the simulated user did not know that value. If the improved dialogue agent informed results from the KB, the simulated user checked whether the target of the simulated user was among them, and provided an appropriate reward.

Some experiments to evaluate the performance of the improved dialogue agent, e.g., KB-InfoBot involved converting dialogue acts from a simulated user into natural language utterances using a separately trained natural language generator (NLG). The NLG was trained in a sequence-to-sequence fashion, which took the dialogue actions (DAs) as input, and generated template-like sentences with slot placeholders via an LSTM decoder, then a post-processing scan was made to replace the slot placeholders with their actual values. In the LSTM decoder, a beam search iteratively considered the top k best sentences up to time step t when generating the token of the time step t+1. Generally, a beam size of 20 could gain 2 BLEU points on average. For the sake of the trade-off between the speed and performance, a beam size of 3 was used in the experiments described below.

There are several sources of error in user utterances. Any value provided by a user may be corrupted with some noise, or substituted completely with an incorrect value of the same type (e.g. "Bill Murray" might become just "Bill" or "Tom Cruise"). The NLG described above is inherently stochastic, and may sometimes ignore the agent request. Increasing the temperature of the output softmax in the NLG may also increase the noise in user utterances Experiments compared our end-to-end model with two sets of baselines. Rule-Based agents that consist of hand-designed belief trackers and a hand-designed policy. The belief trackers searched for tokens in user input that matched a slot-value in the KB, and did a Bayesian update on the probability mass associated with the values found. If the agent asked for a slot, but did not find a value for that slot in the user response, then the corresponding dont-care probability for that slot was set to 1. Experiments compared three variants of the hand-designed policy, which differ in terms of the KB-lookup method. A No-KB version ignores the KB and selected its actions by always asking for the slot with maximum entropy. The Hard-KB version performed a hard-KB lookup (equation 1) and selected the next action based on the entropy of the slots in the retrieved results. Finally, the Soft-KB version computed the full posterior over the KB and selected actions based on the weighted entropy statistic described in equation 11. All of these agents are variants of a known EMDM strategy, with the difference being the way the entropy is computed. At the end of the dialogue, all three agents inform the user with the top results from the KB posterior p$^f$, hence the difference between the three rule-based agents lies in the policy for action selection.

The second set of baselines, Simple-RL agents, retained the hand-designed belief trackers from above, but used a GRU policy network as described above instead of a hand-designed policy. Experiments again compared three variants of these agents, which differed only in the inputs going into the policy network. The No-KB version only took entropy of each of the slot distributions. The Hard-KB version took entropy of the slots in the retrieved results from the KB, along with the number of retrieved results. The Soft-KB version took the weighted entropy of each slot, along with the entropy of the full posterior over KB. The policy network produced a distribution over the M+1 valid actions available to the agent. During training an action was sampled from this distribution to encourage exploration, but for evaluation the argmax was taken. For each version, the inform action was accompanied with results from the KB posterior p$^f$.

Experiments used a movie-centric Knowledge Base constructed using the IMDBPy package accessed from imdbpy.sourcefourge.net. A subset of movies released after 2007 were selected for the experiments, and 6 slots were retained. Statistics for this KB are given in Table 1.

TABLE 1

| | |
|---|---|
| # Movies | 428 |
| # Actors | 51 |
| # Directors | 51 |
| # MPAA Ratings | 67 |
| # Critic Ratings | 68 |
| # Genres | 21 |
| # Release years | 10 |

The original KB was modified to reduce the number of actors and directors in order to make the task more challenging. Experiments also involved randomly removing 20% of the values from the agent's copy of the KB to simulate a real-world scenario where the KB may be incomplete. The user, however, may still know these values.

Experiments used a hidden state size of d=100 for all GRUs, a learning rate of 0.05 for the imitation learning phase and 0.005 for the reinforcement learning phase, and minibatch size 128. The maximum length of a dialogue was limited to 10 turns (a turn includes 1 user action and 1 agent action) beyond which the dialogue was deemed a failure. The input vocabulary was constructed from the NLG vocabulary and bigrams in the KB, and its size was 3078. The agent received a positive reward if the user target was in top R results returned by it, R=5 in the experiments, and the reward was computed as $2(1-(r-1)/R)$, where r is actual rank of the target. For a failed dialogue the agent received a reward of −1, and at each turn it received a reward of −0.1 to positively weight efficient task completion. The discounting factor was set to 0.99.

Experiments compared each of the discussed models along three metrics the average rewards obtained, success rate (where success is defined as providing the user target among top R results), and the average number of turns per dialogue.

Figure 9:
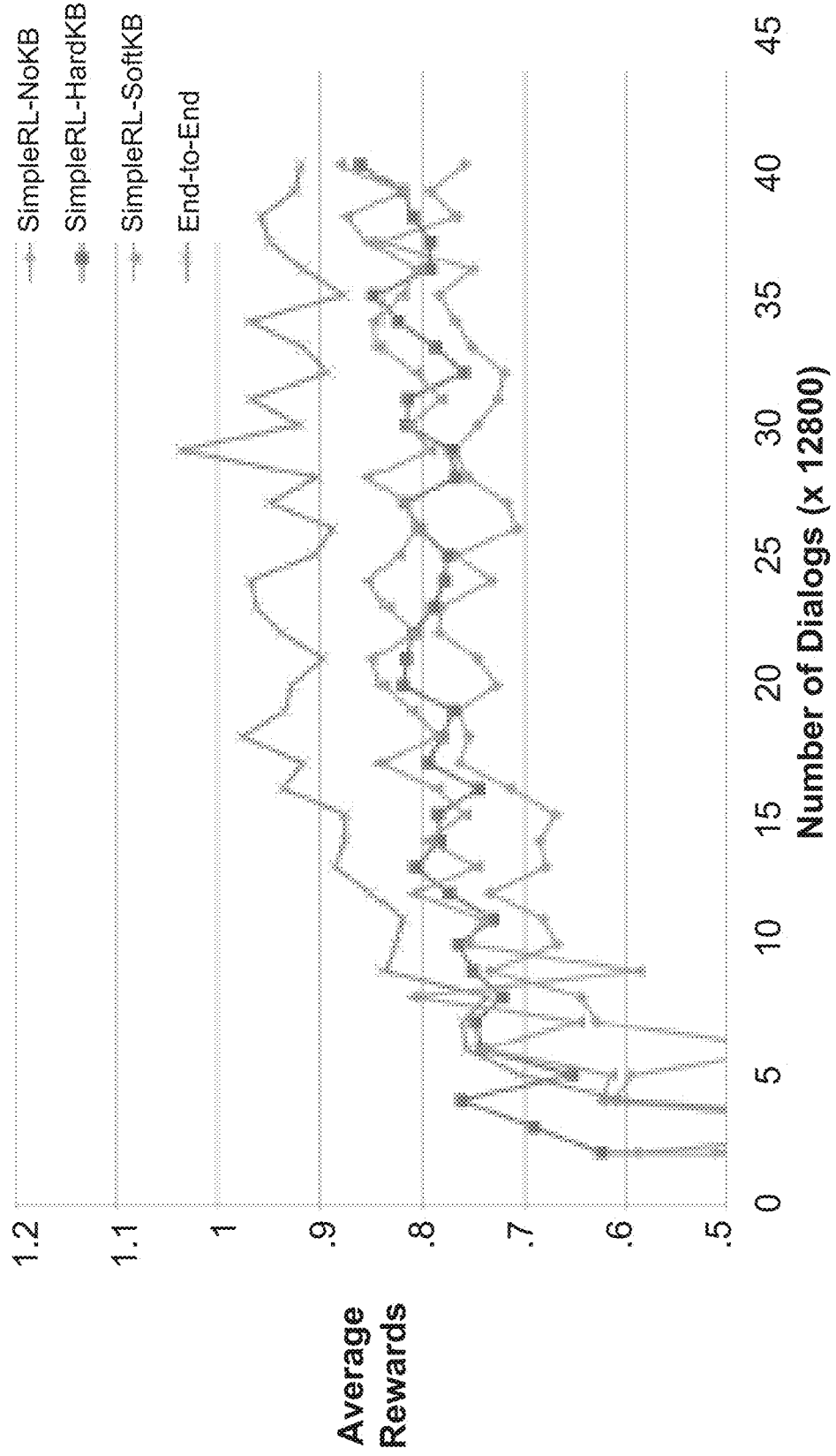
FIG. 9 is a graph showing average rewards during training for each of the models. Evaluation done at intervals of 100 updates, by choosing the optimal policy actions for 2000 simulations.

FIG. 9 shows how the reinforcement learning agents performed as training progressed. This figure was generated by fixing the model every 100 updates, and performing 2000 simulations while selecting optimal policy actions. Table 2 shows the performance of each model over a further 5000 simulations, after selecting the best model during training, and selecting optimal policy actions.

TABLE 2

| Agent | KB Lookup | Success Rate | Avg Turns | Avg |
|---|---|---|---|---|
| Rule-based | No-KB | 0.76 | 5.41 | 0.66 |
| Rule-based | Hard-KB | 0.76 | 4.82 | 0.72 |
| Rule-based | Soft-KB | 0.74 | 3.90 | 0.75 |
| Simple-RL | No-KB | 0.76 | 3.91 | 0.80 |
| Simple-RL | Hard-KB | 0.77 | 4.13 | 0.82 |

TABLE 2-continued

| Agent | KB Lookup | Success Rate | Avg Turns | Avg |
|---|---|---|---|---|
| Simple-RL | Soft-KB | 0.76 | 3.84 | 0.84 |
| End2End-RL | Soft-KB | 0.81 | 4.33 | 0.94 |

As shown, the Soft-KB versions outperform their HardKB counterparts, which in turn outperform NoKB versions, in terms of average reward. The main benefit comes from a reduced number of average turns. The similar success rate for all baseline agents is expected since they all share the same belief trackers, and use the same posterior $p^t$ to inform the results. However, having information about the current state of the KB helps the policy conduct shorter dialogues. These decisions are further helped by having the complete posterior (Soft-KB) rather than just the current set of matching results (Hard-KB).

Reinforcement learning helps discover better policies than the hand-crafted rule based agents, and hence Simple-RL agents outperform the Rule-Based agents. All of these baseline agents, however, are limited by the rule-based belief trackers, and hence have a similar success rate. The end-to-end dialogue agent is not limited as such, and is able to achieve a higher success rate and a higher average reward. Thus, by introducing the Soft-KB lookup the agent is able to improve both the belief trackers and policy network from user feedback directly.

Figure 10:
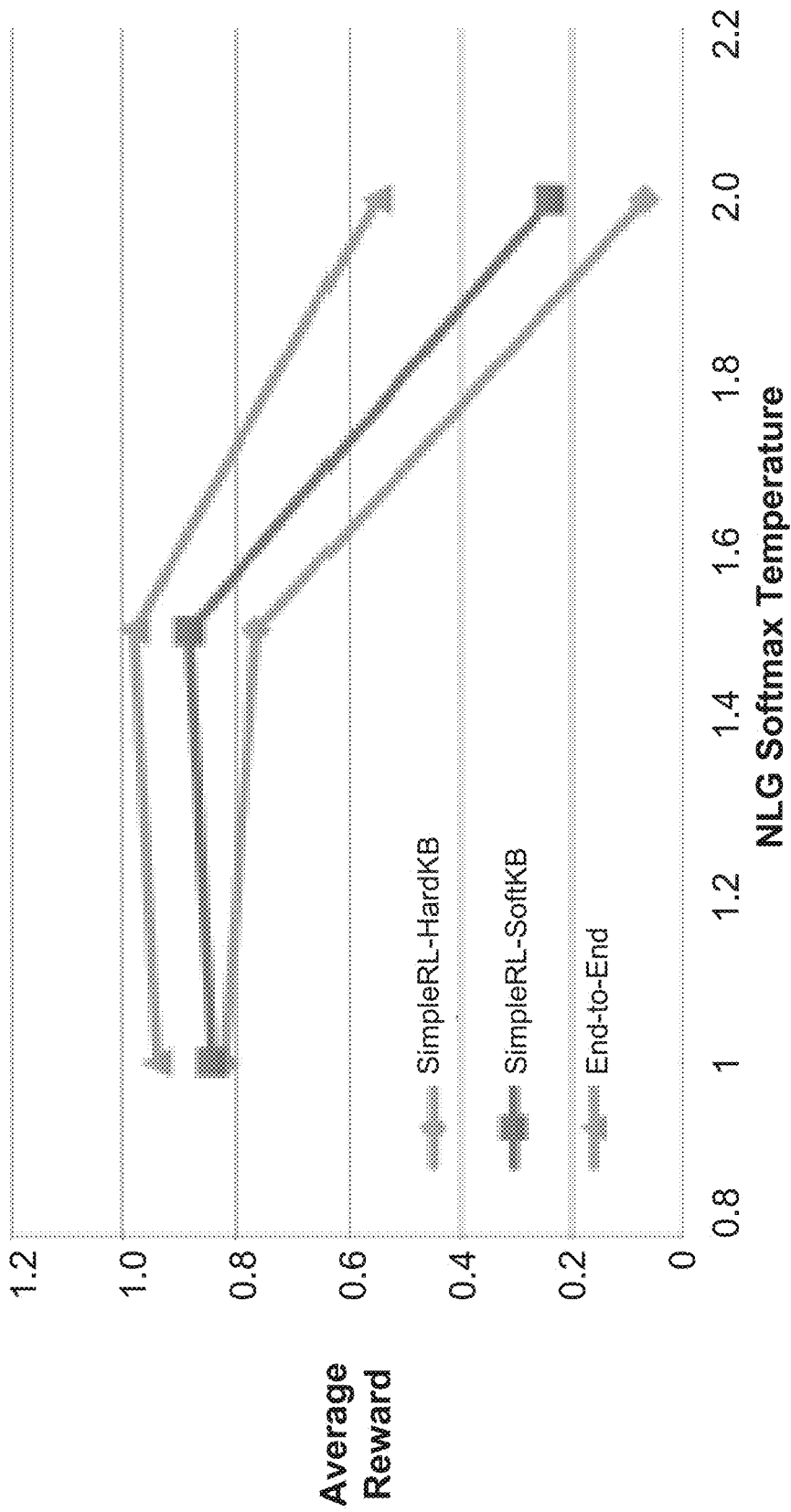
FIG. 10 is a graph showing variation in average rewards as temperature of softmax in NLG output is increased. Higher temperature leads to more noise in output. Average computed across 5000 simulations after selecting the best model during training.

FIG. 10 shows how the average reward of three of the agents varies as the temperature of the output softmax in the user simulator NLG is increased. A higher temperature means a more uniform output distribution, which would lead to user responses being irrelevant to the agent questions. This is a simple way of introducing noise in the user responses for the experiments. As shown in FIG. 10, the performance of all three agents drops as the temperature is increased, but less so for the end-to-end agent, which can adapt its belief tracker to the inputs it receives.

EXAMPLE CLAUSES

1. A method comprising:
building an end-to-end dialogue agent model for end-to-end learning of dialogue agents for information access; and
applying the end-to-end dialogue agent model with soft attention over knowledge base entries to make the dialogue system differentiable.

2. A method as clause 1 recites, further comprising applying the end-to-end dialogue agent model to a source of input.

3. A method as either of clauses 1 or 2 recites, further comprising filling slots for output from the knowledge base entries.

4. A method as any of clauses 1-3 recites, further comprising inducing a posterior distribution over the entities in a knowledge base.

5. A method as any of clauses 1-4 recites, further comprising inducing a posterior distribution of a target of the requesting user over entities from a knowledge base.

6. A method as any of clauses 1-5 recites, further comprising developing, an end-to-end differentiable model of a multi-turn information providing dialogue agent.

7. A method as clause 6 recites, wherein parameters of the end-to-end differentiable model of a multi-turn information providing dialogue agent can be tuned using gradient descent methods, e.g., stochastic gradient descent methods.

8. A method as any of clauses 1-7 recites, further comprising using supervised and/or imitation learning to initialize network parameters, e.g., to good values, reasonably good values, etc.

9. A method as any of clauses 1-7 recites, further comprising calculating a modified version of an episodic algorithm, e.g., a modified version of the episodic REINFORCE algorithm, to update rules for training an end-to-end differentiable model based on user feedback.

10. A method as any of clauses 1-9 recites, wherein the modified version of the REINFORCE algorithm can allow the agent to explore a set of possible dialogue acts at each turn and/or a set of possible entity results from the knowledge base at a final turn.

11. A method as any of clauses 1-10 recites, wherein a neural (NN) architecture is configured to read from the knowledge base entries for the contextual language understanding.

12. One or more computer-readable media configured to be coupled to one or more processing unit(s), the one or more computer readable media having thereon one or more modules of computer-executable instructions to configure a computer to perform a method as any of clauses 1-11 recite.

13. A device comprising:
one or more processing unit(s);
one or more computer-readable media coupled to one or more of the processing unit(s), the one or more computer readable media having thereon one or more modules of computer-executable instructions to configure a computer to perform a method as any of clauses 1-11 recite.

14. A device as clause 13 recites, further comprising a probabilistic framework for inducing a posterior distribution of a target of the requesting user over entities from a knowledge base.

15. A system comprising:
means for building an end-to-end dialogue agent model for end-to-end learning of dialogue agents for information access; and
means for applying the end-to-end dialogue agent model with soft attention over knowledge base entries to make the dialogue system differentiable.

16. A system as clause 15 recites, further comprising means for applying the end-to-end dialogue agent model to a source of input.

17. A system as either of clauses 15 or 16 recites, further comprising means for filling slots for output from the knowledge base entries.

18. A system as any of clauses 15-17 recites, further comprising means for inducing a posterior distribution over the entities in a knowledge base.

19. A system as any of clauses 15-18 recites, further comprising means for inducing a posterior distribution of a target of the requesting user over entities from a knowledge base.

20. A system as any of clauses 15-19 recites, further comprising means for developing, an end-to-end differentiable model of a multi-turn information providing dialogue agent.

21. A system as clause 20 recites, comprising means for tuning parameters of the end-to-end differentiable model of a multi-turn information providing dialogue agent.

22. A system as clause 20 recites, comprising means for tuning parameters of the end-to-end differentiable model of a multi-turn information providing dialogue agent using gradient descent methods, e.g., stochastic gradient descent methods.

23. A system as any of clauses 15-22 recites, further comprising means for using supervised and/or imitation learning to initialize network parameters, e.g., to good values, reasonably good values, etc.

24. A system as any of clauses 15-23 recites, further comprising means for calculating a modified version of an episodic algorithm, e.g., a modified version of the episodic REINFORCE algorithm, to update rules for training an end-to-end differentiable model based on user feedback.

25. A system as any of clauses 15-24 recites, wherein the modified version of the REINFORCE algorithm can allow the agent to explore a set of possible dialogue acts at each turn and/or a set of possible entity results from the knowledge base at a final turn.

26. A system as any of clauses 15-25 recites, further comprising means for configuring a neural (NN) architecture to read from the knowledge base entries for the contextual language understanding.

27. A method comprising:
reading from a knowledge base;
generating a model, end-to-end trained using supervisory and/or reinforcement signals, by at least one of:
inducing a posterior distribution over the entities in the knowledge base;
developing an end-to-end differentiable model of a multi-turn information providing dialogue agent;
using supervised and/or imitation learning to initialize network parameters, e.g., to good values, reasonably good values, etc.; or
calculating a modified version of an episodic algorithm, e.g., the REINFORCE algorithm to update rules for training an end-to-end differentiable model based on user feedback; and
operating the model including a soft attention vector to perform end-to-end semantic parsing of inputs.

28. A method as clause 27 recites, further comprising tuning parameters of the end-to-end differentiable model of a multi-turn information providing dialogue agent using a gradient descent method, e.g., stochastic gradient descent method.

29. A method as either clause 27 or 28 recites, wherein the modified version of the episodic algorithm, e.g., the REINFORCE algorithm can allow the dialogue agent to explore a set of possible dialogue acts at each turn and/or a set of possible entity results from the knowledge base at the final turn.

30. A method as any of clauses 27-29 recites, further comprising inducing a posterior distribution of a target of the requesting user over entities from a knowledge base.

31. One or more computer-readable media configured to be coupled to one or more processing unit(s), the one or more computer readable media having thereon one or more modules of computer-executable instructions to configure a computer to perform a method as any of clauses 27-30 recite.

32. A device comprising:
one or more processing unit(s);
one or more computer-readable media coupled to one or more of the processing unit(s), the one or more computer readable media having thereon one or more modules of computer-executable instructions to configure a computer to perform a method as any of clauses 27-30 recite.

33. A system comprising:
means reading from a knowledge base:
means for generating a model, end-to-end trained using supervisory and/or reinforcement signals, by at least one of:
means for inducing a posterior distribution over the entities in the knowledge base;
means for developing an end-to-end differentiable model of a multi-turn information providing dialogue agent;
means for using supervised and/or imitation learning to initialize network parameters, e.g., to good values, reasonably good values, etc.; or
means for calculating a modified version of an episodic algorithm, e.g., the REINFORCE algorithm to update rules for training an end-to-end differentiable model based on user feedback; and
means for operating the model including a soft attention vector to perform end-to-end semantic parsing of inputs.

34. A system as clause 33 recites, further comprising means for tuning parameters of the end-to-end differentiable model of a multi-turn information providing dialogue agent using a gradient descent method, e.g., stochastic gradient descent method.

35. A system as either clause 33 or 34 recites, wherein the modified version of the episodic algorithm, e.g., the REINFORCE algorithm can allow the dialogue agent to explore a set of possible dialogue acts at each turn and/or a set of possible entity results from the knowledge base at the final turn.

36. A system as any of clauses 33-35 recites, further comprising means for inducing a posterior distribution of a target of the requesting user over entities from a knowledge base.

37. A system comprising:
one or more processing unit(s):
one or more computer-readable media coupled to one or more of the processing unit(s), the one or more computer readable media including:
a neural network (NN) architecture that reads from a knowledge base;
a training engine configured to generate a model, end-to-end trained using supervisory and/or reinforcement signals, by at least one of:
inducing a posterior distribution over the entities in the knowledge base;
developing an end-to-end differentiable model of a multi-turn information providing dialogue agent;
using supervised and/or imitation learning to initialize network parameters, e.g., to good values, reasonably good values, etc.; or
calculating a modified version of an episodic algorithm, e.g., the REINFORCE algorithm to update rules for training an end-to-end differentiable model based on user feedback; and
an operation engine configured to operate the model including a soft attention vector to perform end-to-end semantic parsing of inputs.

38. A system as clause 37 recites, wherein parameters of the end-to-end differentiable model of a multi-turn information providing dialogue agent can be tuned using gradient descent methods, e.g., stochastic gradient descent methods.

39. A system as either clause 37 or 38 recites, wherein the modified version of the episodic algorithm, e.g., the REINFORCE algorithm can allow the dialogue agent to explore a set of possible dialogue acts at each turn and/or a set of possible entity results from the knowledge base at the final turn.

40. A system as any of clauses 37-39 recites, further comprising a probabilistic framework for inducing a posterior distribution of a target of the requesting user over entities from a knowledge base.

41. A method comprising:
at least one of:
computing posterior distribution over knowledge base entries to make the knowledge base differentiable;
computing an entropy over a goal of an individual, e.g., each, slot to make the knowledge base differentiable;
using the calculated entropies and posteriors to output probability of a next action; or
calculating a modified version of an episodic algorithm, e.g., the REINFORCE algorithm to update rules for training an end-to-end differentiable model based on user feedback; and
operating the model including soft attention to perform end-to-end semantic parsing.

42. One or more computer-readable media configured to be coupled to one or more processing unit(s), the one or more computer readable media having thereon one or more modules of computer-executable instructions to configure a computer to perform a method as any variation of clause 41 recites.

43. A device comprising:
one or more processing unit(s);
one or more computer-readable media coupled to one or more of the processing unit(s), the one or more computer readable media having thereon one or more modules of computer-executable instructions to configure a computer to perform a method as any variation of clause 41 recites.

44. A system comprising:
means for processing;
means for configuring one or more computers to perform a method as any variation of clause 41 recites.

41. A system comprising:
at least one of:
means for computing posterior distribution over knowledge base entries to make the knowledge base differentiable;
means for computing an entropy over a goal of an individual, e.g., each, slot to make the knowledge base differentiable;
means for using the calculated entropies and posteriors to output probability of a next action; or
means for calculating a modified version of an episodic algorithm, e.g., the REINFORCE algorithm to update rules for training an end-to-end differentiable model based on user feedback; and
means for operating the model including soft attention to perform end-to-end semantic parsing.

CONCLUSION

Various computational-model training and operation techniques described herein can permit more efficiently parsing input, e.g., queries such as utterances, and more readily identify associated domains to determine a corresponding intent while assigning words of the query to appropriate slots. Various examples can provide more effective ongoing training of a single computational model, e.g., based on application across domains, providing improved accuracy with reduced computational power compared to identifying domains and determining intent and filling slots separately per domain.

Although the techniques have been described in language specific to structural features and/or methodological acts, it is to be understood that the appended claims are not necessarily limited to the features and/or acts described. Rather, the features and acts are described as example implementations of such techniques. For example, network 108, processing unit(s) 112/134/202, and other structures described herein for which multiple types of implementing devices or structures are listed can include any of the listed types, and/or multiples and/or combinations thereof.

The operations of the example processes are illustrated in individual blocks and summarized with reference to those blocks. The processes are illustrated as logical flows of blocks, each block of which can represent one or more operations that can be implemented in hardware, software, and/or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions and/or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing device(s) 102, 104, and/or 200 such as one or more internal and/or external CPUs and/or GPUs, and/or one or more pieces of hardware logic such as FPGAs, DSPs, and/or other types described above.

All of the methods and processes described above can be embodied in, and fully automated via, software code modules executed by one or more general purpose computers and/or processors. The code modules can be stored in any type of computer-readable storage medium and/or other computer storage device. Some and/or all of the methods can be embodied in specialized computer hardware.

Conditional language such as, among others, "can," "could," "might" and/or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples and/or that one or more examples necessarily include logic for deciding, with and/or without user input and/or prompting, whether certain features, elements and/or steps are included and/or are to be performed in any particular example. The word "or" is used herein in an inclusive sense unless specifically stated otherwise. Accordingly, conjunctive language such as the phrases "X, Y. or Z" or "at least one of X, Y or Z," unless specifically stated otherwise, is to be understood as signifying that an item, term, etc., can be either X, Y, or Z, or a combination thereof.

Any routine descriptions, elements and/or blocks in the flow diagrams described herein and/or depicted in the attached figures should be understood as potentially representing modules, segments, and/or portions of code that include one or more executable instructions for implementing specific logical functions and/or elements in the routine. Alternative implementations are included within the scope of the examples described herein in which elements and/or functions can be deleted and/or executed out of order from any order shown or discussed, including substantially synchronously and/or in reverse order, depending on the functionality involved as would be understood by those skilled in the art. It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim or clause is a reference to at least some of the items in the group of items, unless specifically stated otherwise.

What is claimed is:

1. A system comprising:
one or more processing units;
one or more computer-readable media coupled to one or more of the processing units, the one or more computer readable media having thereon one or more modules of computer-executable instructions to configure a computer to perform operations implementing a multi-turn dialogue agent for accessing information in a knowledge base storing entries for a plurality of unique entities, the entries comprising slot values for a plurality of unique slots corresponding to attributes characterizing the entities, the operations comprising, at each dialogue turn:
updating belief states about user goals for the slots based at least in part on an utterance received from a user at the dialogue turn, the belief states comprising probability distributions each associated with one of the slots;
computing, from the belief states, a posterior probability distribution over the entities in the knowledge base, the posterior probability distribution conditioned on at least the user utterance and comprising, for each entity, a posterior probability that the user is interested in that entity; and
selecting a next action of the dialogue agent based on a dialogue state comprising the posterior distribution and the belief states.

2. The system of claim 1, wherein dialogue agent comprises a policy network to select the next action, the policy network using a recurrent neural network.

3. The system of claim 2, wherein the dialogue agent further comprises belief trackers to update the belief states, the belief trackers using a recurrent neural network.

4. The system of claim 2, the operations further comprising training the dialogue agent end-to-end at least in part by reinforcement learning.

5. The system of claim 4, the operations further comprising, prior to training the dialogue agent by reinforcement learning, training the policy network and belief trackers in an imitation learning phase to mimic a hand-designed rule-based agent.

6. The system of claim 1, wherein the belief states comprise, for each of the slots, a multinomial probability distribution over values for the slot and a binomial distribution indicating whether the user knows which value the slot has.

7. The system of claim 6, wherein the operations further comprise, prior to selecting the next action, summarizing the posterior distribution and the multinomial probability distributions into respective entropy measures.

8. The system of claim 6, wherein computing the posterior probability distribution comprises marginalizing, using the binomial distribution, over a binary variable indicating whether the user knows which value the slot has.

9. The system of claim 1, wherein the selected action is either a request action asking the user for a value of one of the slots or an inform action providing an ordered list of one or more entities selected from the knowledge base.

10. The system of claim 1, wherein, for each entity, the posterior probability that the user is interested in that entity is the product, over all slots, of posterior probabilities that a user goal for that slot points to the entity.

11. The system of claim 1, wherein the knowledge base comprises rows corresponding to the unique entities and columns corresponding to the unique slots.

12. A method comprising:
at each dialogue turn between a user and a multi-turn dialogue agent for retrieving entities from a knowledge base storing entries for a plurality of unique entities, the entries comprising slot values for a plurality of unique slots corresponding to attributes characterizing the entities:
performing a differentiable lookup over the knowledge database based on one or more utterances received from the user up to the respective dialogue turn to compute, from belief states about user goals for the slots that comprising probability distributions each associated with one of the slots, a posterior probability distribution over the entities denoting, for each entity, a probability that the user is interested in that entity; and
selecting, based at least in part on the posterior probability distribution, a next action of the dialogue agent among returning one or more entities retrieved from the knowledge base or asking for an attribute of one or more entities the user is interested in.

13. The method of claim 12, wherein performing the differentiable lookup over the knowledge database comprises updating belief states about user goals for the slots based at least in part on the one or more utterances, and computing the posterior distribution from the updated belief states.

14. The method of claim 13, wherein the belief states comprise, for each of the slots, a multinomial probability distribution over values for the slot and a binomial distribution indicating whether the user knows which value the slot has.

15. The method of claim 14, further comprising, prior to selecting the next action, summarizing the posterior distribution and the multinomial probability distributions into respective entropy measures.

16. The method of claim 13, wherein the dialogue agent comprises a policy network to select the next action and belief trackers to update the belief states, the policy network and the belief trackers using recurrent neural networks.

17. The method of claim 16, further comprising training the dialogue agent end-to-end.

18. The method of claim 17, wherein the dialogue agent is trained at least in part by reinforcement learning.

19. The method of claim 17, wherein the dialogue agent is trained in part, prior to training the dialogue agent by reinforcement learning, by imitation learning.

20. A system comprising:
one or more processing units;
one or more computer-readable media coupled to one or more of the processing units, the one or more computer readable media including:
a neural network (NN) architecture that reads from a knowledge base storing entries for a plurality of unique entities, the entries comprising slot values for a plurality of unique slots corresponding to attributes characterizing the entities, the NN architecture comprising:
a plurality of belief trackers updating belief states about user goals for the slots based at least in part on one or more utterances received from a user, the belief states comprising probability distributions each associated with one of the slots, a differentiable soft lookup module computing a posterior probability distribution over the entities in the knowledge base from the belief states and comprising, for each entity, a posterior probability that the user is interested in that entity, and a policy network selecting an action among returning entities retrieved from the knowledge base or asking for an attribute of entities the user is interested in; and a training engine configured to train the NN architecture end-to-end using supervisory and/or reinforcement signals.

* * * * *